US012753090B2

(12) United States Patent
Whitacre et al.

(10) Patent No.: US 12,753,090 B2
(45) Date of Patent: Oct. 6, 2026

(54) MICROWAVE-PROCESSED, ULTRA-RAPID QUENCHED LITHIUM-RICH LITHIUM MANGANESE NICKEL OXIDE AND METHODS OF MAKING THE SAME

(71) Applicant: Stratus Materials Inc., Pittsburgh, PA (US)

(72) Inventors: Jay F. Whitacre, Pittsburgh, PA (US); Wei Wu, Pittsburgh, PA (US); Sven Burke, Pittsburgh, PA (US)

(73) Assignee: Stratus Materials Inc., Pittsburgh, PA (US)

( * ) Notice: Subject to any disclaimer, the term of this patent is extended or adjusted under 35 U.S.C. 154(b) by 698 days.

(21) Appl. No.: 18/149,475

(22) Filed: Jan. 3, 2023

(65) Prior Publication Data

US 2023/0227327 A1 Jul. 20, 2023

Related U.S. Application Data

(63) Continuation-in-part of application No. 17/810,722, filed on Jul. 5, 2022.

(60) Provisional application No. 63/296,244, filed on Jan. 4, 2022, provisional application No. 63/296,243, filed on Jan. 4, 2022.

(51) Int. Cl.
*H01M 10/0525* (2010.01)
*C01G 53/44* (2025.01)

(52) U.S. Cl.
CPC ........ *C01G 53/44* (2013.01); *H01M 10/0525* (2013.01); *C01P 2006/40* (2013.01)

(58) Field of Classification Search
None
See application file for complete search history.

(56) References Cited

U.S. PATENT DOCUMENTS

| | | | | |
|---|---|---|---|---|
| 5,273,848 | A * | 12/1993 | Noguchi | H01M 4/485 252/182.1 |
| 5,824,278 | A | 10/1998 | Yao | |
| 6,677,082 | B2 | 1/2004 | Thackeray et al. | |
| 7,314,684 | B2 | 1/2008 | Kang et al. | |

(Continued)

FOREIGN PATENT DOCUMENTS

| | | |
|---|---|---|
| CN | 102509803 A | 6/2012 |
| CN | 103811745 A | 5/2014 |

(Continued)

OTHER PUBLICATIONS

Feng et al. (CN104466166 (A) and using Machine Translation as English version) (Year: 2015).*

(Continued)

*Primary Examiner* — Wyatt P Mcconnell
*Assistant Examiner* — Joshua P Mcclure
(74) *Attorney, Agent, or Firm* — Wolf, Greenfield & Sacks, P.C.

(57) ABSTRACT

A method includes sintering a lithium-rich metal oxide (LRMO) material at a sintering temperature to form a sintered LRMO material and quenching the sintered LRMO material from the sintering temperature to room temperature in less than 500 milliseconds to form a quenched LRMO material represented by a chemical formula $Li_x(Mn_y Ni_{1-y})_{2-x}O_2$, where x is greater than 1.05 and less than 1.25, and y ranges from 0.95 to 0.1.

16 Claims, 24 Drawing Sheets

(56) References Cited

U.S. PATENT DOCUMENTS

| | | | | |
|---|---|---|---|---|
| 7,468,223 | B2 | 12/2008 | Thackeray et al. | |
| 7,732,096 | B2 | 6/2010 | Thackeray et al. | |
| 7,998,620 | B2 | 8/2011 | Nanno | |
| 8,557,438 | B2 | 10/2013 | Johnson et al. | |
| 9,126,844 | B2 | 9/2015 | Johnson et al. | |
| 10,026,957 | B2 | 7/2018 | Kepler et al. | |
| 10,290,869 | B2 | 5/2019 | Axelbaum et al. | |
| 10,978,707 | B2 | 4/2021 | Bakierska et al. | |
| 2004/0234854 | A1 * | 11/2004 | Kang | C01G 45/1228 423/598 |
| 2010/0015516 | A1 * | 1/2010 | Jiang | H01M 4/525 429/231.95 |
| 2012/0112379 | A1 | 5/2012 | Beppu et al. | |
| 2013/0344388 | A1 | 12/2013 | Simonin et al. | |
| 2016/0164092 | A1 * | 6/2016 | Stottlemyer | C01G 53/50 252/182.1 |
| 2016/0211517 | A1 | 7/2016 | Beck et al. | |
| 2017/0207443 | A1 | 7/2017 | Shen et al. | |
| 2017/0373344 | A1 | 12/2017 | Hadidi et al. | |
| 2020/0168906 | A1 * | 5/2020 | Yeon | H01M 10/0525 |
| 2021/0257613 | A1 * | 8/2021 | Kang | C01G 45/12 |
| 2023/0015455 | A1 | 1/2023 | Whitacre et al. | |
| 2024/0262709 | A1 | 8/2024 | Whitacre et al. | |

FOREIGN PATENT DOCUMENTS

| | | | | |
|---|---|---|---|---|
| CN | 104466166 A | * | 3/2015 | H01M 4/505 |
| CN | 107316991 A | | 11/2017 | |
| CN | 111554920 A | | 8/2020 | |
| JP | H11-31509 | | 7/1997 | |
| KR | 2019-0037384 A | | 4/2019 | |
| KR | 2022-0026284 A | | 3/2022 | |
| WO | WO-2019177394 A1 | * | 9/2019 | C01G 45/12 |
| WO | WO 2023/283168 A1 | | 1/2023 | |
| WO | WO 2023/133106 A1 | | 7/2023 | |

OTHER PUBLICATIONS

Burke, S. et al., "How Synthetic Quench Rate and Composition Affect the Performance of Lithium Nickel Manganese Oxide Cathode Materials," Journal of The Electrochemical Society, vol. 167 (2020) 14 pages.

Dall'asta, V. et al., "Aqueous Processing of $Na_{0.44}$ $MnO_2$ Cathode Material for the Development of Greener Na-Ion Batteries," ACS Appl. Mater. Interfaces 2017, vol. 9, pp. 34891-34899, (2017); DOI: 10.1021/acsami.7b09464.

Neudecker, B.J. et al., "Lithium Manganese Nickel Oxides $Li_x(Mn_yNi_{1-y})_{2-x}O_2$): 1 Synthesis and Characterization of Thin Films and Bulk Phases," Oak Ridge National Laboratory, Solid State Division, Oak Ridge, Tennessee 3 7831-6030, USA, J. Electrochem. Soc., vol. 145, No. 12, pp. 4148-4159, (Dec. 1998).

Tu, W. et al., "Green water-induced spinel heterostructure interface enabling high performance lithium and manganese rich oxides," Electronic Supplementary Material (ESI) for Journal of Materials Chemistry A., vol. 9, pp. 20576-20584, (2021); https://doi.org/10.1039/D1TA04994A.

Zheng, Y. et al., "An interfacial framework for breaking through the Li-ion transport barrier of Li-rich layered cathode materials," J. Mater. Chem. A, vol. 5, pp. 24292-24298, (2017); DOI: 10.1039/c7ta08735g.

U.S. Appl. No. 17/810,722, filed Jul. 5, 2022, 33 Tech, Inc.

International Search Report and Written Opinion for International Application No. PCT/US2022/036082 dated Dec. 7, 2022.

International Search Report and Written Opinion for International Application No. PCT/US2023/010064 dated May 9, 2023.

Armstrong et al., Demonstrating Oxygen Loss and Associated Structural Reorganization in the Lithium Battery Cathode Li[Ni0.2Li0.2Mn0.6]O2. J Am Chem Soc. Jun. 13, 2006;128(26):8694-8.

Arunkumar et al., Factors Influencing the Irreversible Oxygen Loss and Reversible Capacity in Layered Li[Li1/3Mn2/3]O2—Li[M]O2 (M=Mn0.5—yNi0.5—yCo2y and Ni1—yCoy) Solid Solutions. Chem Mater. May 22, 2007;19(12):3067-73.

Azevedo et al., Lithium and cobalt—a tale of two commodities. McKinsey&Company Metals and Mining. Jun. 2018:20 pages.

Binner et al., When Should Microwaves Be Used to Process Technical Ceramics? Materials Science Forum. Oct. 2008;606:51-9.

Blamire et al., The Materials Science of Functional Oxide Thin Films. Adv Mater. Oct. 16, 2009;21(38-39):3827-39.

Bréger et al., Short- and long-range order in the positive electrode material, Li(NiMn)0.5O2: a joint X-ray and neutron diffraction, pair distribution function analysis and NMR study. J Am Chem Soc. May 25, 2005;127(20):7529-37. doi: 10.1021/ja050697u.

Clark et al., Processing materials with microwave energy. Mater Sci Eng A. Aug. 15, 2000;287(2):153-8.

Crompton et al., Lithium rich cathode/graphite anode combination for lithium ion cells with high tolerance to near zero volt storage. J Power Sources. Mar. 1, 2017;341:109-18.

Dupré et al., Contribution of the oxygen extracted from overlithiated layered oxides at high potential to the formation of the interphase. J Power Sources. Dec. 20, 2015;299:231-40.

Eum et al., Voltage decay and redox asymmetry mitigation by reversible cation migration in lithium-rich layered oxide electrodes. Nat Mater. Jan. 20, 2020;19(4):419-27.

Fell et al., Correlation Between Oxygen Vacancy, Microstrain, and Cation Distribution in Lithium-Excess Layered Oxides During the First Electrochemical Cycle. Chem Mater. Mar. 21, 2013;25(9):1621-9.

Gim et al., Synthesis and characterization of integrated layered nanocomposites for lithium ion batteries. Nanoscale Res Lett. Jan. 5, 2012;7(60):1-9.

Helbig et al., Li/Mn-Rich Cathode Materials with Low-Cobalt Content and Core-Shell Particle Design for High-Energy Lithium Ion Batteries. J Electrochem Soc. Apr. 9, 2020;167(6):060519.

Hoang et al., Defect Physics and Chemistry in Layered Mixed Transition Metal Oxide Cathode Materials: (Ni,Co,Mn) vs (Ni,Co,Al). Chem Mater. Feb. 8, 2016;28(5):1325-34.

Huang et al., Advanced Li-Rich Cathode Collaborated with Graphite/Silicon Anode for High Performance Li-Ion Batteries in Half and Full Cells. Electrochim Acta. Nov. 10, 2015;182:1175-87.

Jarvis et al., Formation and effect of orientation domains in layered oxide cathodes of lithium-ion batteries. Acta Mater. Apr. 15, 2016;108:264-70.

Jiang et al., Electrochemical and Structural Study of the Layered, "Li-Excess" Lithium-Ion Battery Electrode Material Li[Li1/9Ni1/3Mn5/9]O2. Chem Mater. Jun. 9, 2009;21(13):2733-45.

Kong et al., Synthesis of lithium rich layered oxides with controllable structures through a MnO2 template strategy as advanced cathode materials for lithium ion batteries. Ceram Int. Jul. 2019;45(10):13011-8.

Laubach et al., Changes in the crystal and electronic structure of LiCoO2 and LiNiO2 upon Li intercalation and de-intercalation. Phys Chem Chem Phys. Mar. 25, 2009;11(17):3278-89.

Lee et al., Superior Rate Capability and Cycling Stability in Partially Cation-Disordered Co-Free Li-Rich Layered Materials Enabled by an Initial Activation Process. Chem Mater. Jun. 22, 2021;33(13):5115-26.

Lee et al., The effect of quenching media on the heat transfer coefficient of polycrystalline alumina. J Mater Sci. Jan. 1, 1993;28:2079-2083.

Lim et al., Li[Li0.2Ni0.16Mn0.56Co0.08]O2 Nanoparticle/Carbon Composite Using Polydopamine Binding Agent for Enhanced Electrochemical Performance. Nanoscale Res Lett. Jun. 26, 2016;10;270):9 pages.

Liu et al., Understanding electrochemical potentials of cathode materials in rechargeable batteries. Mater Today. Mar. 2016;19(2):109-23.

Long et al., Effect of Cooling Rates on Phase Separation in 0.5Li2MnO3•0.5LiCoO2 Electrode Materials for Li-Ion Batteries. Chem Mater. May 20, 2014;26(11):3565-72.

Lu et al., Structure and Electrochemistry of Layered Li [ Crx Li ( 1/3-x/3 ) Mn ( 2/3-2x/3 ) ] O 2. J Electrochem Soc. Oct. 3, 2002;149(11):A1454-9.

(56) References Cited

OTHER PUBLICATIONS

Lu et al., Synthesis, Structure, and Electrochemical Behavior of Li [ Nix Li1/3-2x/3Mn2/3-x/3 ] O 2. J Electrochem Soc. Apr. 30, 2002;149(6):A778-91.
Maier, Nanoionics: ion transport and electrochemical storage in confined systems. Nat Mater. Nov. 1, 2005;4:805-15.
Manthiram et al., Nickel-Rich and Lithium-Rich Layered Oxide Cathodes: Progress and Perspectives. Adv Energy Mater. Oct. 7, 2015;6(1):1501010.
Mccalla et al., Structural Study of the Li—Mn—Ni Oxide Pseudoternary System of Interest for Positive Electrodes of Li-Ion Batteries. Chem Mater. Feb. 27, 2013;25(6):989-9.
Meng et al., Cation Ordering in Layered O3 Li[NixLi1/3-2x/3Mn2/3-x/3]O2 (0≤ x≤1/2) Compounds. Chem Mater. Mar. 23, 2005;17(9):2386-94.
Meng et al., Enhanced Structural Stability and Improved Electrochemical Performance of Layered Lithium-Rich Cathode Materials via Tellurium Doping. J Electrochem Soc. Aug. 30, 2017;164(12):A2594-602.
Meng, Combining Ab Initio Computation with Experiments for Designing/Understanding High Energy Density Electrode Materials for Advanced Lithium Batteries. Thesis. The Singapore-MIT Alliance. 2005. 194 pages.
Nakayama et al., Grain size control of LiMn2O4 cathode material using microwave synthesis method. Solid State Ionics. Oct. 2003;164(1-2):35-42.
Nisar et al., Fast and Scalable Synthesis of LiNi0.5Mn1.5O4 Cathode by Sol-Gel-Assisted Microwave Sintering. Energy Tech. Apr. 13, 2021;9(7):2100085.
Park et al., Structural investigation and electrochemical behaviour of Li[NixLi(1/3-2x/3)Mn(2/3-x/3)]O2 compounds by a simple combustion method. J Power Sources. Apr. 22, 2004;129(2):288-95.
Park et al., Synthesis of LiFePO4 by co-precipitation and microwave heating. Electrochem Commun. Oct. 2003;5(10):839-42.
Rao et al., Synthesis of Inorganic Solids Using Microwaves. Chem Mater. Mar. 25, 1999;11(4):882-95.
Rietveld, A profile refinement method for nuclear and magnetic structures. J Appl Crystallogr. Jun. 1969;2(2):65-71.
Rowe et al., Positive Electrode Materials in the Li—Mn—Ni—O System Exhibiting Anomalous Capacity Growth during Extended Cycling. J Electrochem Soc. Dec. 24, 2013;161(3):A308.
Singh et al., Effect of bath and specimen temperature on the thermal stress resistance of brittle ceramics subjected to thermal quenching. J Mater Sci. Aug. 1981;16:2109-18.
Song et al., Microwave synthesized TiP2O7 assisted by carbon-coating as anode material for aqueous rechargeable lithium-ion batteries. Nano Select. Oct. 5, 2020;1(5):539-46.
Subramanian et al., Microwave-assisted solid-state synthesis of LiCoO2 and its electrochemical properties as a cathode material for lithium batteries. J Mater Chem. Oct. 17, 2001;11(12):3348-53.
Taffel, Hopeful Extinctions? Tesla, Technological Solutionism and the Anthropocene. J Curr Cult Res. Oct. 30, 2018;10(2):163-84.
Toby et al., GSAS-II: the genesis of a modern open-source all purpose crystallography software package. J Appl Crystallogr. Mar. 18, 2013;46(2):544-9.
Tu et al., Phase Transformation of Lithium-rich Oxide Cathode in Full Cell and its Suppression by Solid Electrolyte Interphase on Graphite Anode. Ener Environ Mater. Aug. 12, 2019;3(1):19-28.
Vaidhyanathan et al., High Microwave Susceptibility of NaH2PO4•2H2O: Rapid Synthesis of Crystalline and Glassy Phosphates with NASICON-Type Chemistry. J Solid State Chem. Sep. 1997;132(2):349-54.
Vaidhyanathan et al., Microwave-Assisted Synthesis and Sintering of NZP Compounds. J Am Ceramic Soc. May 2004;87(5):834-9.
Wang et al., High capacity double-layer surface modified Li[Li0.2Mn0.54Ni0.13Co0.13]O2 cathode with improved rate capability. J Mater Chem. Jun. 5, 2009;19(28):4965-72.
Wang et al., One-step Hydrothermal Synthesis of Li1.24Mn0.66Ni0.1O2 Cathode for Lithium-ion Batteries. Int J Electrochem Sci. 2016;11:333-42.
Wentker et al., A Bottom-Up Approach to Lithium-Ion Battery Cost Modeling with a Focus on Cathode Active Materials. Energies. Feb. 5, 2019;12(3):504.
Whittingham, Ultimate limits to intercalation reactions for lithium batteries. Chem Rev. Dec. 10, 2014;114(23):11414-43. doi: 10.1021/cr5003003. Epub Oct. 29, 2014.
Wu et al., Effect of surface modifications on the layered solid solution cathodes (1-z) Li[Li1/3Mn2/3]O2-(z) Li[Mn0.5-yNi0.5-yCo2y]O2. Solid State Ionics. Feb. 16, 2009;180(1):50-6.
Wu et al., High Capacity, Surface-Modified Layered Li [Li( 1-x ) /3Mn ( 2-x ) /3Nix/3Cox/3 ] O2 Cathodes with Low Irreversible Capacity Loss. Electrochem Solid-State Lett. Mar. 2, 2006;9(5):A221-4.
Wu et al., Microwave Synthesized NaTi2(PO4)3 as an Aqueous Sodium-Ion Negative Electrode. J Electrochem Soc. Jan. 18, 2013;160(3):A497-504.
Zhang et al., Cationic Ordering Coupled to Reconstruction of Basic Building Units during Synthesis of High-Ni Layered Oxides. J Am Chem Soc. Aug. 31, 2018;140(39):12484-92.
Zhang et al., Surface nitridation of Li-rich layered Li(Li0.17Ni0.25Mn0.58)O2oxide as cathode material for lithium-ion battery. J Mater Chem. May 2, 2012;22(26):13104-9.
Zheng et al., Mitigating Voltage Fade in Cathode Materials by Improving the Atomic Level Uniformity of Elemental Distribution. Nano Lett. Apr. 7, 2014;14(5):2628-35.
Zheng et al., Recent developments and challenges of Li-rich Mn-based cathode materials for high-energy lithium-ion batteries. Mater Today Energy. Dec. 2020;18:100518.
Extended European Search Report for EP Application No. 22838296.6 dated May 2, 2025.
International Search Report and Written Opinion for International Application No. PCT/US2024/013773 dated Jun. 13, 2024.
International Preliminary Report on Patentability (Chapter 1) for International Application No. PCT/US2024/013773 dated Aug. 14, 2025.
Chen et al., Toward Alleviating Voltage Decay by Sodium Substitution in Lithium-Rich Manganese-Based Oxide Cathodes. ACS Appl Energy Mater. Jul. 2018;1(8):4065-74.
Du et al., Sodium additive to improve rate performance of Li[Li0.2Mn0.54Ni0.13Co0.13]O2 material for Li-ion batteries. J Power Sources. Dec. 15, 2013;244:29-34.
Ma et al., Na-substitution induced oxygen vacancy achieving high transition metal capacity in commercial Li-rich cathode. Nano Energy. Mar. 2021;81:105622.
Nomura et al., The effect of cooling process on the structure and charge/discharge capacities of Li-rich solid-solution layered oxide cathode materials for the Li-ion battery. RSC Adv. Jan. 6, 2021;11(3):1715-1728. doi: 10.1039/d0ra06680j.
Pang et al., Enhanced electrochemical performance of Li-rich layered cathode materials via chemical activation of Li2MnO3 component and formation of spinel/carbon coating layer. J Pow Sour. Oct. 15, 2017;365:68-75.
Thackeray et al., Comments on the structural complexity of lithium-rich Li1+xM1−xO2 electrodes (M=Mn, Ni, Co) for lithium batteries. Electrochem Commun. Sep. 2006;8(9):1531-8.
Extended European Search Report for EP Application No. 23737526.6 dated Dec. 19, 2025.

* cited by examiner

FIG. 23A
FIG. 23B
FIG. 23C
FIG. 23D
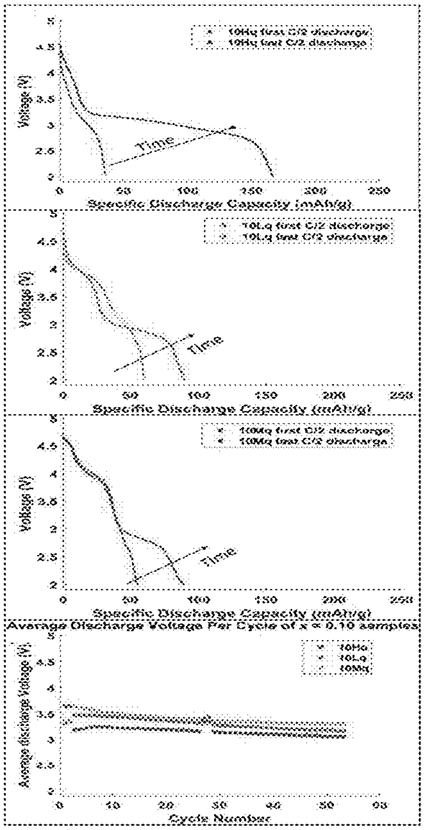
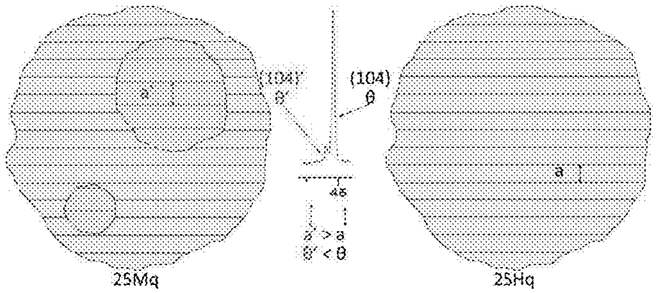
FIG. 24

MICROWAVE-PROCESSED, ULTRA-RAPID QUENCHED LITHIUM-RICH LITHIUM MANGANESE NICKEL OXIDE AND METHODS OF MAKING THE SAME

CROSS-REFERENCE TO RELATED APPLICATIONS

This application is a continuation-in-part of U.S. patent application Ser. No. 17/810,722, filed on Jul. 5, 2022, which claims the benefit of priority to U.S. Provisional Patent Application No. 63/218,756, filed Jul. 6, 2021, the entire contents of which are incorporated herein by reference. This application also claims the benefit of priority to U.S. Provisional Patent Application No. 63/296,243, filed on Jan. 4, 2022, and U.S. Provisional Patent Application No. 63/296,244, filed on Jan. 4, 2022, the entire contents of which are incorporated herein by reference.

FIELD

Aspects of the present invention relate to cathode materials for lithium-ion batteries, and more particularly, to lithium-rich lithium nickel manganese oxide cathode active materials, and methods of making the same.

BACKGROUND

Cobalt containing cathode material in lithium-ion batteries accounts for substantial fraction of the cost of a contemporary battery cell, and the cobalt is a key contributor to the cost. Cobalt has supply chain complexities that make it a volatile commodity. As such, there is a need for reliable cobalt-free lithium-ion battery cathode materials.

SUMMARY

According to various embodiments, a method includes sintering a lithium-rich metal oxide (LRMO) material at a sintering temperature to form a sintered LRMO material and quenching the sintered LRMO material from the sintering temperature to room temperature in less than 500 milliseconds to form a quenched LRMO material represented by a chemical formula $Li_x(Mn_yNi_{1-y})_{2-x}O_2$, where x is greater than 1.05 and less than 1.25, and y ranges from 0.95 to 0.1.

According to various embodiments, a method include thermally decomposing a precursor material using microwave radiation to form a thermally decomposed lithium-rich metal oxide (LRMO) material, sintering the thermally decomposed LRMO material to form a sintered LRMO material, and quenching the sintered LRMO material to form a quenched LRMO material represented by a chemical formula: $Li_x(Mn_yNi_{1-y})_{2-x}O_2$, where x is greater than 1.05 and less than 1.25, and y ranges from 0.95 to 0.1.

According to various embodiments, a cathode electrode active material is represented by a chemical formula: $Li_x(Mn_yNi_{1-y})_{2-x}O_2$, where x is greater than 1.05 and less than 1.25, and y ranges from 0.95 to 0.1. The active material comprises layered hexagonal and monoclinic phases. The active material exhibits at least one of: a (106)+(102):(101) x-ray diffraction peak intensity ratio of greater than 0.32; delivery of at least a 165 mAh/g specific capacity at a C/20 rate on first discharge when included in a lithium-ion battery; less than 10% loss in average discharge voltage at a C/20 rate after 100 charge/discharge cycles when included in the lithium-ion battery; and/or less than 10% capacity fade over 100 C/5 charge/discharge cycles when included in the lithium-ion battery.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIGS. 23A-23C are graphs showing a first C/2 discharge and a last C/2 discharge of 10Hq, 10Lq, and 10Mq samples, and FIG. 23D is a graph showing the average discharge voltage per cycle over the course of cycling, for the 10Hq, 10Lq, and 10Mq samples.

FIG. 24 is a schematic diagram showing how phase impurity inclusion in the 25Mq sample with R-3m structure and lattice parameter a'>a cause the secondary peak as seen to the left of 25Mqs (104) peak.

DETAILED DESCRIPTION

Figure 1:
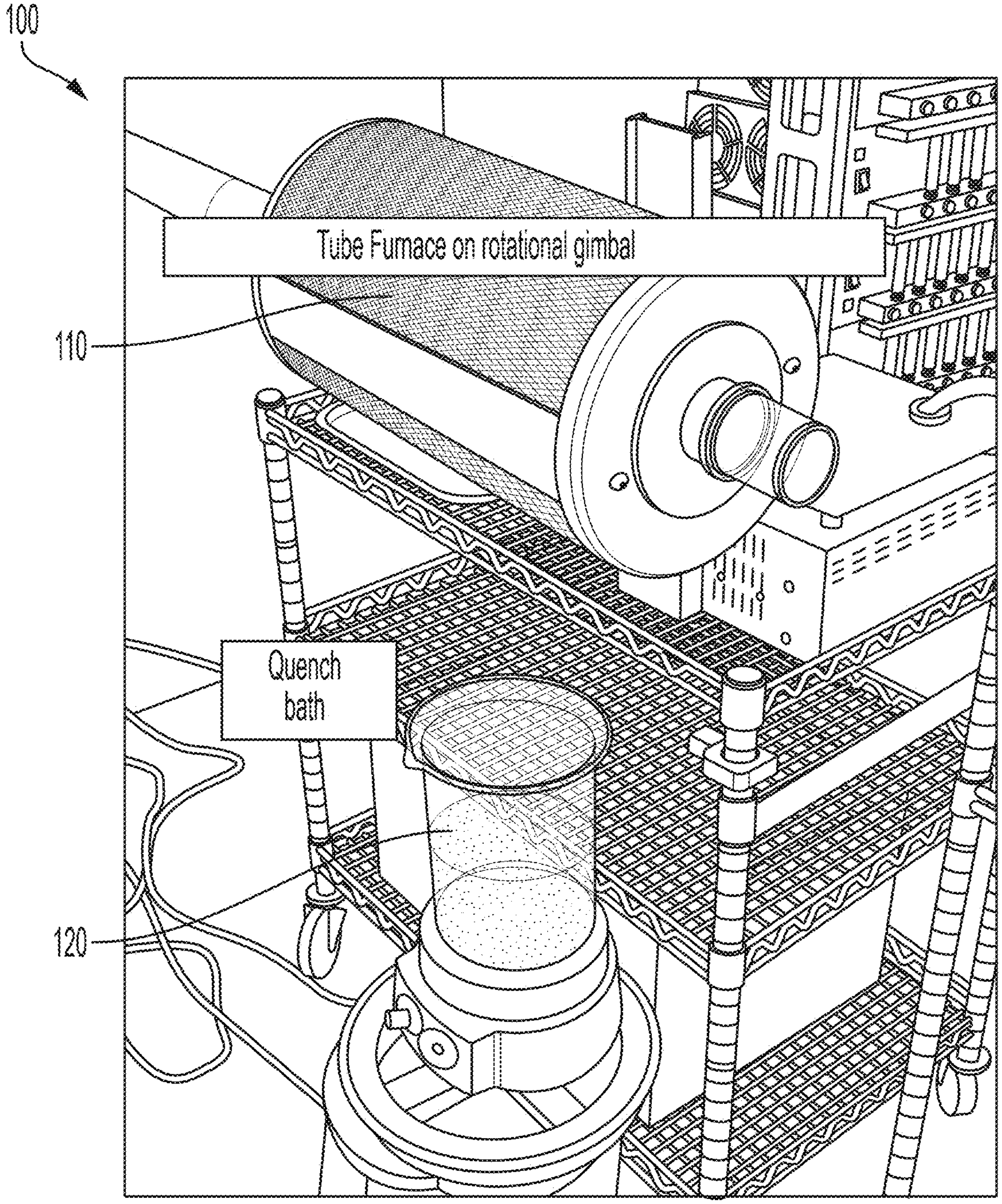
FIG. 1 is a drawing of a rapid quenching system, according to various embodiments of the present disclosure.

As set forth herein, various aspects of the disclosure are described with reference to the exemplary embodiments and/or the accompanying drawings in which exemplary embodiments of the invention are illustrated. This invention may, however, be embodied in many different forms and should not be construed as limited to the exemplary embodiments shown in the drawings or described herein. It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X. It will be further understood that the endpoints of each of the ranges are significant both in relation to the other endpoint, and independently of the other endpoint.

According to various embodiments, a method of quickly and inexpensively forming a crystallographically-stable, highly durable, cobalt-free, lithium-rich metal oxide (LRMO) material is provided. In some embodiments, the LRMO material may be a lithium-rich, lithium manganese nickel oxide material represented by the following general Formula 1:

$$Li_x(Mn_yNi_{1-y})_{2-x}O_2, \quad \text{(Formula 1)}$$

wherein x is greater than 1.0 and less than 1.25, and y ranges from 0.95 to 0.1, for example from about 0.8 to 0.5.

In some embodiments, the LRMO material may be a lithium-rich, lithium manganese nickel oxide material represented by the following Formula 2:

$$Li[Li_{(1/3-2x/3)}Mn_{(2/3-x/3)}Ni_x]O_2, \quad \text{(Formula 2)}$$

wherein x ranges from 0.1 to 0.4.

The LRMO material in its pristine state (e.g., before it is charged for the first time), may have distinct hexagonal (e.g., rhombohedral) and monoclinic phases. Thus, the LRMO material may be represented by the expression: $(\mathbf{1}\text{-}x)[Li_2MnO_3]*_x[LiMn_aNi_{(1-a)}O_2]$, wherein the first part of this expression denotes the relative molar amount of the monoclinic phase (1-*x*), while the second part of this expression denotes the relative molar amount of the rhombohedral phase (x). The molar fraction of the rhombohedral phase, “x”, commonly ranges between 0.8 and 0.95, while “a” ranges from 0.6 to 0.9. In some embodiments, the two phases may be disposed in a layered structure.

Various embodiments provide LRMO materials that exhibit high (e.g., >240 mAh/g) specific capacities and high functional voltage windows (e.g., 2.0-4.8 V), when used as an active material of a cobalt-free cathode.

According to various embodiments, methods of forming LRMO materials include rapid thermal processing and rapid (e.g., less than 10 seconds) or ultra-rapid (e.g., less than 500 milliseconds) quenching that result in a LRMO material having a superior crystal structure with a desired atomic order/disorder. These features may provide unexpectedly robust long-term stability and performance when used as a cathode active material.

Conventional LRMO materials are generally unsuitable for use as a cathode active material due to having a low rate capability and poor capacity retention, which are believed to result from structural instability due to oxygen losses, transition metal ion migration during use, and possible manganese dissolution. The two most common aging mechanisms manifest as a fade in the average discharge voltage as the material slowly re-organizes into a predominant spinel structure, and loss in capacity over cycling due mechanical and/or chemical degradation of the material.

Thermal Decomposition and Processing

LRMO materials may be synthesized from precursor materials by a variety of methods. The following Table 1 includes particular methods that may be used to synthesize LRMO materials, including precursor synthesis, precursor materials, quenching methods, performance metrics, and discharge capacity (DC) of LRMO material cathodes.

TABLE 1

| Source # | Route | Precursors | Quench | x = | 3rd DC (mAh/g) |
|---|---|---|---|---|---|
| 4 | Sol-gel then combustion | Acetates and Nitrates | Metallic | 0.50 | 170 |
| | | | | 0.33 | 225 |
| | | | | 0.25 | 230 |
| | | | | 0.17 | 235 |
| 5 | Precipitation then combustion | Nitrates and Hydroxides | Slow Cooling | 0.33 | 128 |
| | | | | 0.42 | 138 |
| | | | | 0.50 | 155 |
| | | | Metallic | 0.33 | 135 |
| | | | | 0.42 | 150 |
| | | | | 0.50 | 145 |
| | | | | 0.17 | 225 |
| | | | | 0.25 | 255 |
| | | | | 0.33 | 250 |
| | | | | 0.42 | 235 |
| | | | | 0.50 | 200 |
| 7 | Hydrothermal | Acetates, Nitrates, and Hydroxides | none | 0.10 | 200 |
| 9 | Precipitation then combustion | Nitrates and Hydroxides | LN2 | 0.33 | 190 |
| | | | | 0.33 | 110 |
| 10 | Precipitation then combustion | Nitrates and Hydroxides | LN2 | 0.50 | |
| 11 | Precipitation then combustion | Nitrates and Hydroxides | Slow Cooling | 0.20 | |

TABLE 1-continued

| Source # | Route | Precursors | Quench | x = | 3rd DC (mAh/g) |
|---|---|---|---|---|---|
| 12 | Sol-gel then combustion | Nitrates and Glycine | LN2 | 0.50 | |
| | | | | 0.40 | |
| 13 | Sol-gel then combustion | Acetates and misc | No mention | 0.20 | |
| 21 | Precipitation then combustion | Chlorides and Hydroxides | LN2 | 0.25 | 220 |
| | | | | 0.25 | 260 |
| | | | | 0.25 | 215 |
| | | | | 0.25 | 260 |
| 22 | Sol-gel then combustion | Acetates and Misc | no mention | 0.2 | 210 |
| | | | | 0.2 | 215 |
| 26 | Precipitation then combustion | Hydroxides | LN2 | 0.33 | |
| 28 | Precipitation then combustion | Sulfates and Carboantes | No mention | 0.20 | |
| 29 | Precipitation then combustion | Sulfates, Carboantes, and Misc | No mention | 0.23 | 180 |
| 30 | Precipitation | Sulfates, and | No mention | | 215 |
| | Sol-Gel | misc Acetates | No mention | | 215 |
| | Hydrothermal | Acetates and PVP | Na | 0.2 | 225 |

As shown in Table 1, the three main synthetic routes for LRMO materials include precipitation followed by combustion, hydrothermal synthesis, and sol-gel solution production followed by intermediate temperature decomposition and high temperature thermal processing (e.g., calcination, annealing, sintering).

As can be seen in Table 1, the number of investigations exploring the effects of nickel composition on the performance LRMO cathodes has decreased over time; with few studies exploring multiple nickel compositions or nickel compositions below x=0.2 in cathodes having the formula $Li[Ni_xLi_{(1/3-2x/3)}Mn_{(2/3-x/3)}]O_2$. Table 1 also shows that there are significant inconsistencies in synthetic routes employed across studies. Additionally, there are few studies that perform a detailed comparative assessment relating the effects of synthetic approach to performance of LRMO cathodes. In LRMO materials, the ordering and disordering of transition metals may be important, and both composition and synthetic techniques may provide mechanisms for influencing the degree of structural order and disorder. The electrochemical behaviors these compositional and synthetic changes could impose, such as different defect concentrations for example, may lead to pronounced effects on the properties of LRMO cathodes.

Without wishing to be bound by a particular theory, it is believed that when a sample is quenched in liquid nitrogen the particles are immediately shielded by an insulating envelope of nitrogen gas, similar to the Leidenfrost effect, which significantly reduces heat transfer rate. It is believed that in the prior art, lithium containing cathode materials for lithium ion batteries are not brought in contact with moisture because water leaches out lithium from such cathode materials and forms a lithium hydroxide coating on the materials. Furthermore, water is known to cause malfunctions in lithium ion batteries, such as lithium-ion batteries which contain lithium iron phosphate cathode materials.

While not wishing to be bound to a particular theory, the present inventors believe that the relatively slow conventional quenching and cooling process result in agglomeration of metal oxides, thereby forming segregated nickel oxide and lithium manganese oxide phases. In particular, nickel oxide phase may be concentrated on the surface of LRMO material particles (e.g., crystallites). It is believed that this surface nickel oxide agglomeration is at least partially responsible for the chemical instability of conventional LRMO active materials.

In contrast, the present inventors have unexpectedly determined that water quenching does not negatively affect the LRMO cathodes and does not cause lithium leaching from such LRMO cathodes. It is believed that water quenching results in vaporization in the form of bubble nucleation and dissipation, which actually increases the rate of heat transfer. As such, it is believed that water quenching should have a rate of heat transfer that can be approximated as two orders of magnitude greater than liquid nitrogen quenching. Further, water and additives solvated into it (i.e., other materials that may be dissolved in the water) can both react with the high temperature LRMO as it quenches to create advantageous surface terminations and/or coatings that enhance electrochemical stability and durability when used in a lithium-ion battery.

Additionally, in many of the prior art quench routes described above, the quenching is done on pressed sintered or partially sintered pellets of the material that are intact as larger bodies (e.g., having a width on the order of centimeters). In contrast, in embodiments of the present disclosure, the quenching is performed on loose and/or milled powder with particles that are in shapes agglomerates that are 20 microns or less in average diameter, such as 0.1 to 20 microns, for example, 0.1 to 1 microns or 1 to 20 microns, in average diameter, such that when the particles contact the quenching liquid (e.g., water) all of the material cools rapidly and at approximately the same rate. Each agglomerate is composed of crystallites having an average size ranging from about 25 nm to about 500 nm, such as 50 nm to 200 nm. Each crystallite may comprise a single crystal of the LRMO material. The crystallites may be partially fused together in the agglomerate or fully fused together in the agglomerate. If the crystallites are fully fused in the agglomerate (i.e., in a powder particle), then each crystallite comprises a single crystal grain of the powder particle which is separated from other single crystal grains in the same powder particle by grain boundaries. The average crystal grain size of the powder particles may range from about 25 nm to about 500 nm, such as 50 nm to 200 nm. The agglomerates may be relatively porous, which allows the water to reach the crystallites inside the agglomerate.

Rapid and Ultra-Rapid Quenching

According to various embodiments, a LRMO cathode active material may be formed by thermally processing (e.g., sintering, calcining, and/or annealing) and quenching the LRMO material powder. In particular, the thermal processing may include a high-temperature process where the LRMO material may be heated to a process temperature ranging from about 800° C. to about 1000° C., such as from about 850° C. to about 950° C., or about 900° C. The thermal processing may be carried out in any suitable thermal processing apparatus, such as a furnace, for example a tube furnace, muffle box furnace, etc., In some embodiments, the thermal processing may optionally include one or more low-temperature precursor decomposition (e.g., firing) processes where the LRMO material is heated to a temperature above room temperature and below 800° C. For example, the firing may include heating the LRMO material to a temperature ranging from about 450° C. to about 550° C., such as about 500° C., prior to the high-temperature process.

According to various embodiments, the quenching process may include transferring the heated LRMO material to a quench bath. For example, the LRMO material may be dropped directly into from the thermal processing apparatus into the quench bath.

In prior art methods, the LRMO material may slowly cool during transfer from the furnace. For example, the transfer process may take up to about 10 seconds, during which the temperature of the LRMO material may be slowly reduced. The present inventors have determined that slow cooling prior to entering the quench bath may result in undesirable changes to the crystal structure of the sintered LRMO material. In other words, the temperature at which the sintered LRMO material enters the quench bath may be important to providing a desired crystal structure. For example, slow cooling may result in a less desirable crystal structure.

According to various embodiments, the transfer process may be configured such that the sintered LRMO material enters the quench bath after a sintering process at a temperature of at least 800° C., such as a temperature ranging from 800° C. to 950° C., or from about 850° C. to about 925° C., or about 900° C. For example, the transfer time from the thermal processing apparatus to the quench bath may be limited to 10 seconds or less, such as 1 seconds or less, such as less than 0.5 seconds, or 0.2 seconds or less. Thus, the sintered LRMO material is cooled from the thermal processing temperature (e.g., from the sintering temperature of at least 800° C., such as a temperature ranging from 800° C. to 950° C., or from about 850° C. to about 925° C., or about 900° C.) to room temperature (e.g., 25° C.) in 10 seconds or less, such as less than 0.5 seconds, including 0.2 seconds or less. Herein, an "ultra-rapid quenching process" may have a cooling time of less than 0.5 seconds, such as 0.2 seconds or less, for example 0.1 to 0.2 seconds, and a "rapid quenching process" may have a cooling time of 10 seconds or less, such as from 0.5 seconds to 10 seconds.

The sintered LRMO powder particles may be quenched in the quench bath at an average rate of at least 50° C./second, such as 50° C./second to 10,000° C./second. For example, the sintered LRMO powder particles may be quenched at a rate of 87.5° C./second to 8750° C./second, such as at least 1750° C./second, for example 1750° C./second to 8750° C./second, including 4375° C./second to 8750° C./second. Thus, the sintered LRMO material may be quenched from a temperature between the thermal processing temperature (e.g., sintering temperature) of at least 800° C. to the temperature of the quench bath (e.g., room temperature water bath at 25° C.) in 10 seconds or less, such as in less than 500 milliseconds, including 400 milliseconds or less, 300 milliseconds or less, or 200 milliseconds or less. For example, the quenching may occur in from 100 milliseconds to 400 milliseconds, or from 100 to 200 milliseconds.

The quench bath may comprise a high heat capacity liquid solvent having a vaporization temperature of below about 200° C. For example, the quench bath may comprise a solvent, such as water, an oil, and/or an alcohol. In some embodiments, the quench bath may comprise additives configured to modify the surface of the LRMO material during quenching to improve long term chemical stability of the material. The additive may comprise an acid, an alcohol and/or a dissolved carbon species, such as the acid, the alcohol or the carbon species dissolved in water.

For example, the quench bath may be an aqueous quenching solution that includes from about 0.01 to about 1.0 moles per liter, such as from about 0.1 to 1.0 moles per liter, or from about 0.5 to 1.0 moles per liter, of an acid additive, such as sulfuric acid, hydrochloric acid, nitric acid, oxalic acid, citric acid, acetic acid, phosphoric acid, orthophosphoric acid, combinations thereof, or the like. The acid may be configured to stabilize the surface of the LRMO particles by reacting with and/or passivating dangling bonds and/or OH terminal groups of the LRMO power particles that are being quenched in the water containing the acid additive.

In some embodiments, the acid quenching may result in the formation of a spinel structure (e.g., surface layer) on the surfaces the quenched LRMO powder particles. The spinel structure may form a framework that stabilizes the particles and provides three-dimensional pathways for lithium diffusion. In particular, it is believed that the acid may result in an exchange of Li ions of the particles with H ions of the acid, and a subsequent structural transformation of the surface of the particles, resulting in the formation of the spinel surface layer.

In another embodiment, the quenching solution may include an alcohol and/or a carbohydrate additive in addition to or in place of the acid additive. For example, the alcohol may include isopropyl alcohol or another alcohol, and the carbohydrate may include a sugar, such as fructose, galactose glucose, lactose, maltose, sucrose, combinations thereof, or the like. In some embodiments, the quenching solution may include from about 0.01 to about 1.0 moles per liter, such as from about 0.1 to 1.0 mole per liter, or from about 0.5 to 1.0 mole per liter, of the carbohydrate additive. The carbohydrates may form an intimate amorphous carbon coating on the surface of the LRMO powder particles during the quenching process in water containing the carbohydrate particle. The carbon coating may be permeable to Li ions but may be impermeable to an electrolyte of the Li-ion battery. The carbon coating may also permit volumetric changes in the LRMO crystallites to occur during charging and discharging of the battery.

The rapid or ultra-rapid quenching processes may produce a quenched LRMO material having a crystal structure that provides unexpected robustness and electrical characteristics. Specifically, the degree of crystalline order in the quenched LRMO material (e.g., lithium-rich lithium manganese nickel oxide) that is produced by the quenching processes may provide performance characteristics that are suited for use as a cathode active material of a lithium-ion battery that provides energy density and charge storage stability characteristics that are similar to that of cathodes that include cobalt-containing, high nickel-content, active materials.

The quenching processes may produce a quenched LRMO material powder having a desired crystal structure and particle size. For example, the sintered LRMO material being quenched may be a loose powder having an average particle size of about 1 μm or less, such as an average particle size ranging from about 0.02 μm to about 1 μm, or from about 0.05 μm to about 0.5 μm. The quenched LRMO material may include crystal phases and/or crystallites having an average crystal size ranging from about 25 nm to about 500 nm, such as from about 50 nm to about 300 nm, in some embodiments. Each powder particle may comprise one crystallite or more than one crystallite. The loose sintered and quenched powder particles may be incorporated into a binder (e.g., carbon binder) to form a cathode electrode for a Li-ion battery.

The quenched LRMO material is dried to form a LRMO active material (e.g., the thermally processed and quenched loose powder particles) may have a hexagonal primary phase and a monoclinic secondary phase. Thus, the ratio of the hexagonal phase content to monoclinic phase content is greater than 1, such as at least 2, for example 2 to 20. For example, the sintered and quenched LRMO material (e.g., dried active material) may have a superlattice structure including hexagonal primary phase layers separated by interlayers of the monoclinic secondary phase. Alternatively, the sintered and quenched LRMO material may include a hexagonal phase matrix containing monoclinic phase nanozones (i.e., areas having a width of less than a micron). Mn and Ni may be homogenously distributed within the crystal structure of the LRMO material (e.g., excess Mn, Ni and Li are homogenously and uniformly distributed on the transition metal crystal lattice sites). For example, crystalline particles of the sintered and quenched LRMO material exhibit a uniform distribution of Mn and Ni atoms throughout the crystalline particles such that there are no regions that are Ni rich or Mn rich when imaged by high-angle annular dark-field (HAADF) energy dispersive X-ray spectrometry (EDS) (i.e., in EDS elemental maps of HAADF tunneling electron microscopy images). In one embodiment, the term "no regions that are Ni rich or Mn rich" in a crystalline particle means that there are no crystalline volumes greater than 3×3×3 nm in the crystalline particle in which there is a greater than 3% difference between ratios of Ni and Mn atoms compared to average ratios of the Ni and Mn atoms in the entire crystalline particle.

The crystal structure of the as-formed active LRMO material may be changed by electrochemical cycling. For example, when the active LRMO material is included as an active material in an electrochemical cell, after a first charge/discharge cycle, the monoclinic phase may no longer be present at detectable levels. It is believed that the monoclinic phase may be consumed during Li ion insertion and/or extraction.

Rapid Precursor Decomposition

LRMO materials may be formed from various precursor materials. For example, precursor materials may be metalloorganic compounds comprising a metal, such as Li, Mn, and/or Ni, and a solubilizing agent, such as an organic ligand. For example, precursor materials may include metal acetates, metal carbonates, metal nitrates, metal sulfates, and/or metal hydroxides.

In various embodiments, LRMO materials may be formed by thermally decomposing a precursor material followed by sintering and quenching the resulting thermally decomposed LRMO material. The precursor material may comprise a gel formed via a sol-gel process. The present inventors have determined that rapidly decomposing a precursor material gel may improve the homogeneity of LRMO materials. For example, in a sol part of the sol-gel process, stoichiometric amounts of Li, Mn, and Ni-containing precursors may be mixed with water to form an aqueous mixture. For example, stoichiometric amounts of $Li(CH_3COO)*2H_2O$, $Mn(CH_3COO)_2*4H_2O$, and $Ni(NO_3)_2*6H_2O$, may be mixed to form the aqueous mixture. However, the present disclosure is not limited to any particular precursor materials. For example, in some embodiments, all acetate precursors or all nitrate precursors (i.e., lithium, manganese and nickel nitrates) may be used. In some embodiments, the mixture may comprise from a 0.01 to 0.20 molar fractional excess of the lithium acetate precursor to compensate for lithium loss during processing.

The mixture may then be heated to form the precursor gel. For example, the mixture may be heated at a temperature ranging from about 90° C. to about 150° C., such as about 100° C., for a time period sufficient for gelation to occur.

The gel may then be thermally decomposed. For example, the gel may be heated at a temperature and for a time period sufficient to extract (e.g., volatize and/or decompose) solubilizing agents, such as organic ligands and/or solvents of the gel and form a thermally decomposed LRMO material.

The thermal decomposition may be performed using a conventional furnace, such as a muffle box and/or tube furnace. However, such devices generally have slow heating and cooling rates on the order of 1 to 10° C. per minute, and do not employ any type of direct radiation thermal energy input. As such, conventional furnaces may require at least 8 hours of processing time and a significant amount of energy to form the thermally decomposed LRMO material.

According to various embodiments, rapid (e.g., high rate) heating methods are used to form a thermally decomposed LRMO material. For example, an embodiment may utilize microwave radiation to thermally process LRMO precursor materials (i.e., to rapidly decompose LRMO precursors, such as the gel precursors formed via a sol-gel process).

Microwaves are defined as electromagnetic radiation with wavelengths from 1 mm to 1m. The widely adopted domestic microwave ovens use microwave radiation with frequency around 2.45 GHz. Regulations have restricted the microwave frequencies that may be used for domestic and industrial applications. The mechanisms of microwave heating are attributed into two categories: 1) the flow of current under the external electric field generated by microwave radiation generates heat due to ohmic effect; and 2) dipoles that exist in ceramic re-orientate themselves under a changing electric field generate heat due to frictions.

Microwave heating may allow for lower thermal processing (e.g., precursor thermal decomposition) temperatures. Microwave heating may also allow for shorter heating times, due to very rapid local heating, as compared to conventional furnace heating processes. The intimate mixing of precursor materials may also allow for more efficient volumetric heating than conventional furnace heating processes.

In some embodiments, microwave heating is used to heat and decompose precursor materials and form thermally decomposed LRMO materials. For example, the precursor materials may include ligands and/or metals that are highly susceptible to microwave radiation. As such, various embodiments utilize microwave radiation in order to heat precursors and/or precursor gels to very high temperatures in very short periods of time. It has also been found that microwave heating also provides highly uniform heat dispersion. As such, employing microwave radiation can dramatically change the rate of heating and the resulting thermally decomposed LRMO material organization and/or structure. For example, microwave heating of a precursor gel may result in a highly homogenous thermally decomposed LRMO material. The thermally decomposed LRMO material may be in a form of an inorganic ash that is devoid of organic components (e.g., contains no carbon or an unavoidable amount of carbon). As such, microwave heating may allow for thermally decomposed LRMO materials to be formed without the need for a separate furnace firing, which may be omitted.

For example, a precursor gel may be provided to a microwave furnace, where microwave radiation is used to decompose the gel and form the thermally decomposed LRMO material. For example, microwave radiation may be used to heat the gel to a temperature of at least 350° C., such as a temperature ranging from about 350° C. to about 500° C., for a time period sufficient to volatilize the ligands and/or solvents of the gel and form the thermally decomposed LRMO material (e.g., LRMO inorganic ash). In various embodiments, the thermally decomposed LRMO material may be formed in about 30 minutes or less, such as in about 15 to 30 minutes, using a continuous or pulsed microwave having power level of 20,000 W per kg of microwaved material, or less. Accordingly, the microwave-based heating process may be configured to rapidly remove (e.g., vaporize and/or combust) organic components from precursor species in order to form the thermally decomposed LRMO material having improved structural characteristics, such as homogenous cation and/or metal oxide distribution.

While microwave thermal decomposition of precursor gel formed by the sol-gel process is described above, in other embodiments, the precursors that are thermally decomposed by microwaves may be formed by other methods. For example, alternative precursor preparation methods may include a mechanical milling/mixing method, a freeze-drying rotary evaporation, or a co-precipitation method. In one embodiment co-precipitation method, precursors comprising hydroxides of Mn and Ni may be mixed with lithium carbonate and co-precipitated. For example, solid state precursor materials including $Li_2CO_3$ or LiOH, nickel oxide, and manganese oxide may also be used. Such solid state precursors may also have an excess of Li-containing precursor (e.g., lithium carbonate or hydroxide) of 0.01 to 0.20 molar fractional excess to overcome losses in lithium content during processing. The precursors prepared by any of these methods may also be subjected to the microwave thermal decomposition to form the thermally decomposed LRMO material (i.e., the LRMO inorganic ash).

The thermally decomposed LRMO material (i.e., the LRMO inorganic ash) may then be mixed and ground (e.g., milled) to form a precursor LRMO powder. The precursor LRMO powder is then thermally processed (e.g., sintered) in any suitable thermal processing apparatus, such as in a furnace, such as a tube furnace, muffle box, etc., to form a sintered LRMO material. For example, the precursor LRMO powder material may be heated (e.g., sintered) at the thermal processing temperature (e.g., a temperature of at least 800° C., such as about 900° C.), for a time period ranging from about 12 to about 24 hours, and then the sintered LRMO material may be rapidly or ultra-rapidly quenched as described above to form the quenched LRMO material. The quenched LRMO material may then be dried and optionally reground (e.g., milled) into a LRMO active material (e.g., active cathode material powder). This LRMO active cathode material powder may then be mixed with a binder or other inactive cathode material to form a cathode of a Li-ion battery.

According to various embodiments, methods of forming LRMO materials may include a combination of rapid heating, such as microwave heating, for at least a part of the thermal processing, combined with rapid or ultra-rapid quenching, in order to produce LRMO materials having unexpectedly high performance. Specifically, this process may produce LRMO material having a high degree of atom/cation disorder/homogeneity (which can be quantified using X-ray diffraction), along with no or substantially no surface segregation of nickel or nickel oxide in the particles (e.g., crystallites), which can be observed using transmission electron microscopy. The combination of these material attributes produces cathode active materials that exhibit little to no capacity fade over 100's to 1000's of charge/discharge cycles, a substantially reduced or eliminated loss in average discharge voltage during cycling, and rate capabilities that are suitable for commercial use.

According to various embodiments, the embodiment methods which include microwave heating and/or rapid/ultra-rapid quenching step, may be used to form LRMO active materials that do not suffer from the chemical instability of prior art LRMO materials. In particular, the rapid or ultra-rapid quenching step may be used to form LRMO active materials having reduced Ni surface segregation and increased structural homogeneity, as compared to conventional LRMO materials which are slow cooled after sintering. In various embodiments, the above microwave heating process may be used in conjunction with rapid or ultra-rapid quenching to form LRMO active materials. For example, thermally decomposed LRMO materials formed using microwave decomposition may be sintered and then subjected to the rapid or ultra-rapid quenching process.

In one embodiment, a cathode electrode (i.e., positive electrode) includes a LRMO active material comprising a powder embedded in a binder. The powder may have an average particle/agglomerate size ranging from about 0.1 μm to about 10 μm and am average crystal (i.e., crystallite) size ranging from about 25 nm to about 500 nm. In one embodiment, the particles of the LRMO active material powder may have at least one of a spinel surface layer, a carbon coating (e.g., resulting from the carbohydrate additive in the quench bath) and/or passivated oxygen bonds on a surface (e.g., resulting from the acid additive in the quench bath). The cathode electrode may be included in a battery, such as a lithium-ion battery, that also includes an anode electrode (i.e., a negative electrode), an electrolyte and a separator.

In one embodiment, the cathode electrode active material may be represented by a chemical formula $Li_x(Mn_yNi_{1-y})_{2-x}O_2$, where x is greater than 1.05 and less than 1.25, and y ranges from 0.95 to 0.1. The active material may comprise layered hexagonal (e.g., rhombohedral) and monoclinic phases at least prior to first electrochemically cycling a battery containing the cathode electrode. The active material may exhibit at least one of (i) a (106)+(102):(101) x-ray diffraction peak intensity ratio of greater than 0.32, such as 0.33 to 0.346; and/or (ii), a (003) to (104) x-ray diffraction peak ratio of greater than 2, such as 2.01 to 2.575; and/or (iii) delivery of at least 200 mAh/g, such as 200 to 230 mAh/g, specific capacity on first discharge (e.g., at C/2 rate) when the cathode electrode is included in a lithium-ion battery; and/or (iv) the lithium-ion battery exhibits less than 10% loss in average discharge voltage at a C/20 rate after 100 charge/discharge cycles when the cathode electrode is included in the lithium-ion battery; and/or (v) less than 10%, such as less than 5% capacity fade (e.g., 0 to 4% capacity fade or an increase in capacity) over at least 100 charge/discharge cycles, such as over 200 C/5 charge/discharge cycles, when included in the positive electrode of the lithium-ion battery. In one embodiment, the lithium-ion battery may include lithium or graphite as the anode electrode.

In one embodiment, an average discharge voltage of the battery (e.g., lithium-ion battery) does not decrease more than 5% (e.g., 0 to 4%) over 50 C/20 (charge)-C/2 (discharge) charge/discharge cycles; and/or a discharge capacity of the battery is greater than 80% of its original capacity after 800 C/20-C/2 charge/discharge cycles.

EXPERIMENTAL EXAMPLES

A LRMO powder having the formula $Li_x(Mn_yNi_{1-y})_{2-x}O_2$, where x=1.16 and y=0.7 was produced using the following method. In particular, a precursor material gel was produced using a sol-gel solid-state synthesis method. Synthesis of the sol included forming an aqueous mixture including stoichiometric amounts of $Li(CH_3COO)*2H_2O$, $Mn(CH_3COO)_2*4H_2O$, and $Ni(NO_3)_2*6H_2O$. The mixture was heated at 100° C. until the gel was formed. The gel was poured into an alumina crucible and then fired at 400° C. for 90 minutes, resulting in an ash devoid of organics. The resultant ash was ground and re-fired in the crucible at 500° C. for 3 hours and then allowed to naturally cool before being reground, after which the powder was sintered at 900° C. for 24 hours before being quenched. All sintering happened in a box furnace in ambient fume hood conditions. All quenching took place after 12-24 hours of heating at 900° C.

Figure 2:
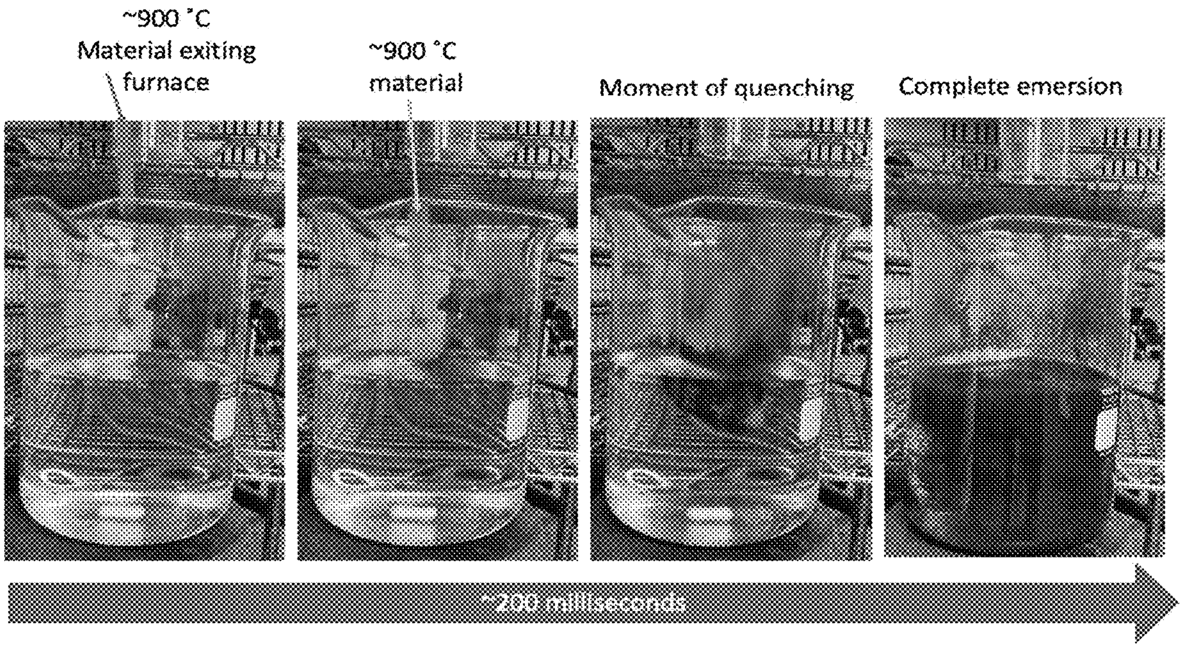
FIG. 2 includes four sequential video capture time-laps images filmed at 30 frames per second, showing a rapid quenching process, according to various embodiments of the present disclosure.

FIG. 1 is a drawing of a rapid quenching system 100, according to various embodiments of the present disclosure. FIG. 2 includes 4 sequential video capture time-lapse images filmed at 30 frames per second, showing a rapid quenching process, according to various embodiments of the present disclosure.

Referring to FIGS. 1 and 2, the LRMO material was provided to a tube furnace 110, where the material is heated to 900° C. The heated LRMO material was output from the tube furnace 110 and quenched to room temperature in a quench bath 120. The tube furnace 110 rotates while operating such that its contents are instantly dumped into the quench bath 110. The time period between the time where the LRMO material exits the furnace 110 at 900° C. to time it is quenched to room temperature takes less than 500 milliseconds, such as less than 200 milliseconds to form a LRMO active material. After quenching, the LRMO material was filtered from the water of the quench bath 120 and dried in a vacuum oven.

In a first comparative example, the LRMO material was allowed to slowly cool in the furnace 110 after the sintering at 900° C. In a second comparative example, the LRMO material was cooled by being dumped onto a metal plate after the sintering. In a third comparative example, the LRMO material was first cooled to room temperature slowly and then inserted into tube furnace 110 for the ultra-rapid quench step, which was kept at 900° C. for 30 to 120 minutes prior to the ultra-rapid quench step.

In alternative examples, LRMO power was formed using a rapid precursor decomposition process. In particular, the sol-gel precursor material described above was decomposed using microwave radiation to form an LRMO powder having improved component distribution. In particular, the application of microwave radiation resulted in rapid volatilization of the organic components of the precursor materials, due to the absorption of microwave energy by the organic components. As such, the LRMO components were homogeneously mixed on a molecular level due to the thermal energy generated by the microwave radiation. The resulting LRMO powder was then sintered for between 12 and 24 hours at 900° C. and then ultra-rapidly quenched as described above.

Multiple larger batches (up to 1 kg) of the cathode material were produced both with and without microwave decomposition and ultra-rapid quenching.

Materials Characterization

Figure 3:
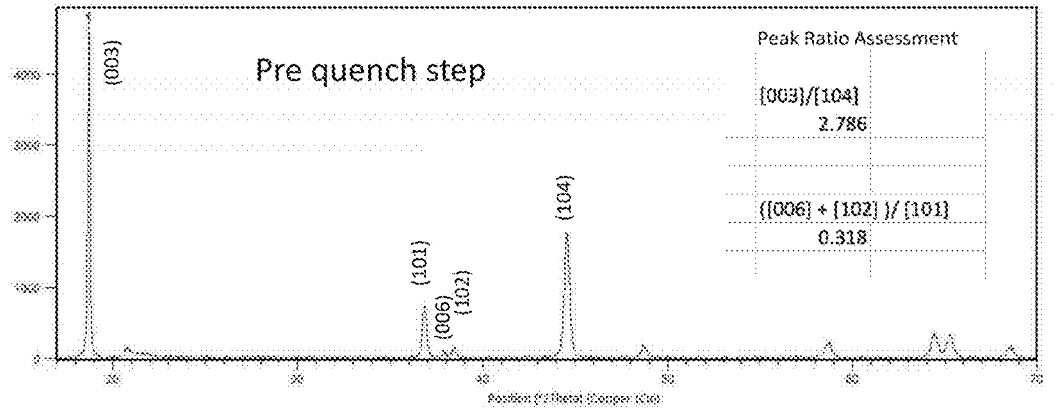
FIGS. 3 and 4 are graphs showing X-ray diffraction (XRD) patterns for $Li_x(Mn_yNi_{1-y})_{2-x}O_2$ materials, where x=1.2, and y=0.75 before and after rapid quenching respectively, according to various embodiments of the present disclosure.
Figure 4:
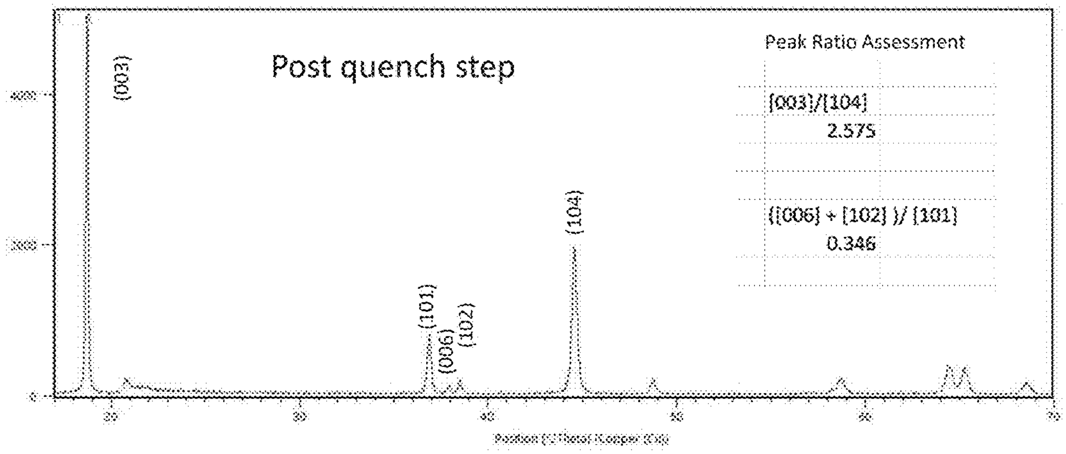

FIGS. 3 and 4 are graphs of X-ray diffraction (XRD) patterns for $Li_x(Mn_yNi_{1-y})_{2-x}O_2$ materials, where x=1.2, and y=0.75, according to various embodiments of the present disclosure. The XRD pattern in FIG. 3 was generated from a layered LRMO active material that was not rapidly quenched via immersion in water, while the XRD pattern in FIG. 4 was generated from a layered LRMO active material that was rapidly quenched via immersion in water.

An assessment of the XRD patterns shows that the LRMO materials possess the expected hexagonal (e.g., rhombohedral) phase $LiNiO_2$-related, space group (R-3m) and a monoclinic phase ($Li_2NiO_3$-related, space group (C2/c).

Figure 5:
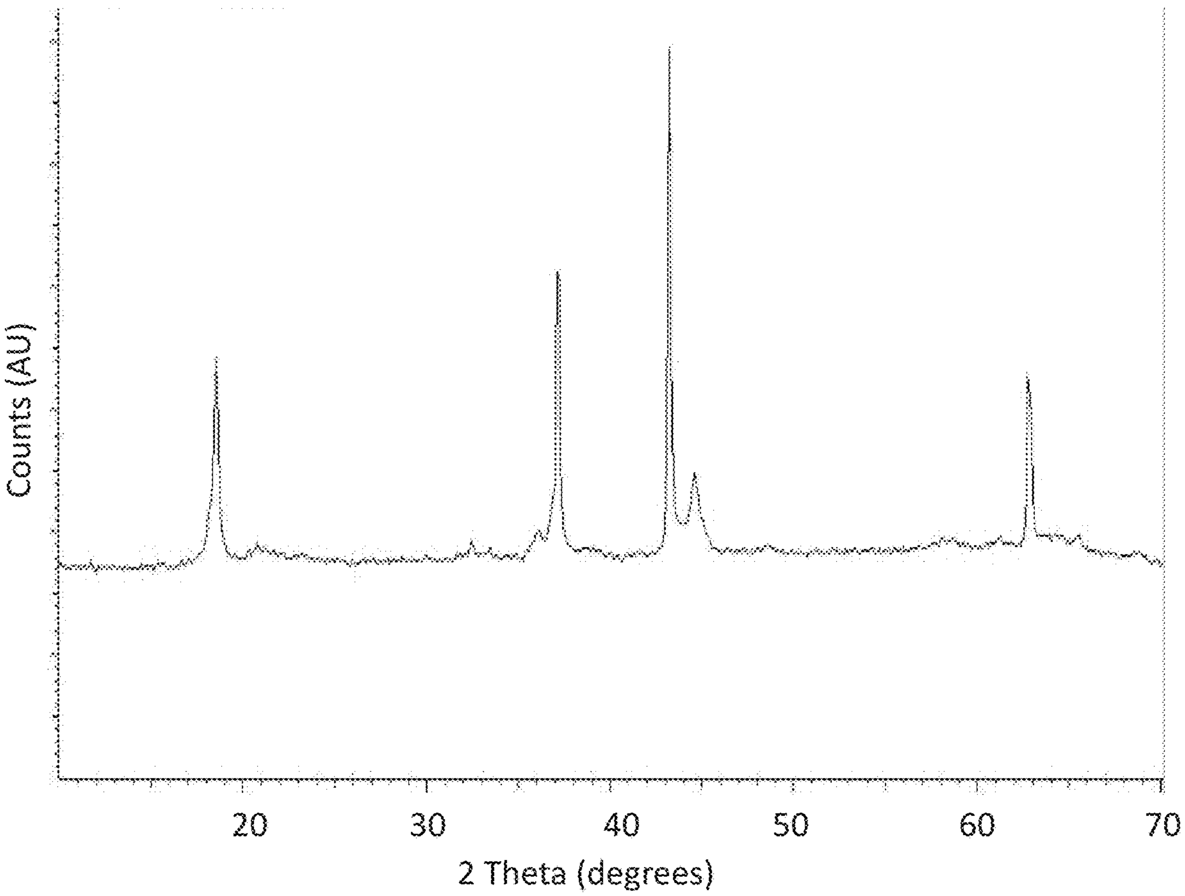
FIG. 5 is a graph showing X-ray diffraction pattern for a $Li_x(Mn_yNi_{1-y})_{2-x}O_2$ material, where x=1.16, and y=0.7 for a material processed using only microwave heating of the sol-gel precursor materials for 5 minutes, according to various embodiments of the present disclosure.

FIG. 5 is a graph showing X-ray diffraction results for a $Li_x(Mn_yNi_{1-y})_{2-x}O_2$ material, where x=1.16, and y=0.7, that was processed using microwave heating of the sol-gel precursor materials for 5 minutes prior to the high temperature firing step, according to various embodiments of the present disclosure. Referring to FIG. 5, of key interest is the fact that this microwave decomposed material has a resultant x-ray diffraction pattern that is consistent with that of a highly crystalized and optimized material, including a rhombohedral phase $LiNiO_2$-related space group (R-3m) and a monoclinic phase $Li_2NiO_3$-related, space group (C2/c). Thus, the material is suitable for forming a LRMO using 900° C. annealing and rapid and/or ultra-rapid quenching, as described above.

Figure 6:
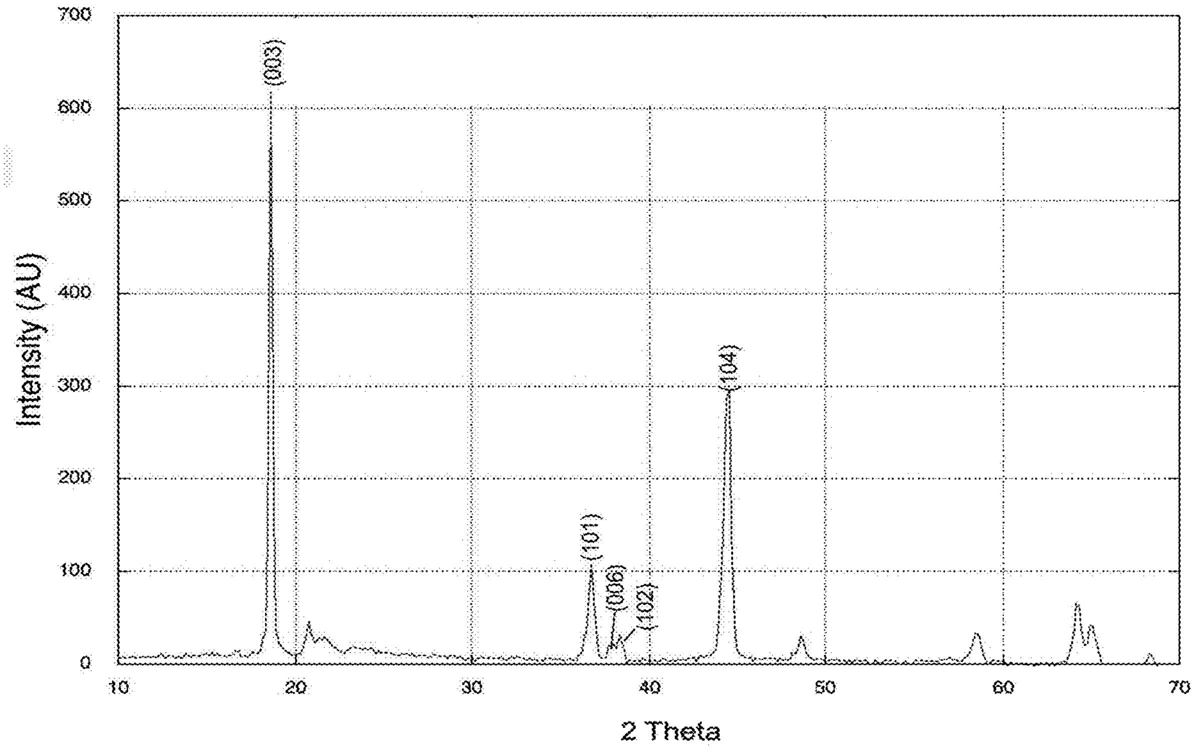
FIG. 6 is a graph illustrating X-ray diffraction pattern for a $Li_x(Mn_yNi_{1-y})_{2-x}O_2$ material, where x=1.16, and y=0.7, that was processed using microwave heating and ultra-rapid quenching, according to various embodiments of the present disclosure.

FIG. 6 is a graph illustrating X-ray diffraction results for a $Li_x(Mn_yNi_{1-y})_{2-x}O_2$ material, where x=1.16, and y=0.7, that was processed using microwave heating and ultra-rapid quenching, according to various embodiments of the present disclosure. Referring to FIG. 6, all expected peaks are present and well defined.

Figure 7A:
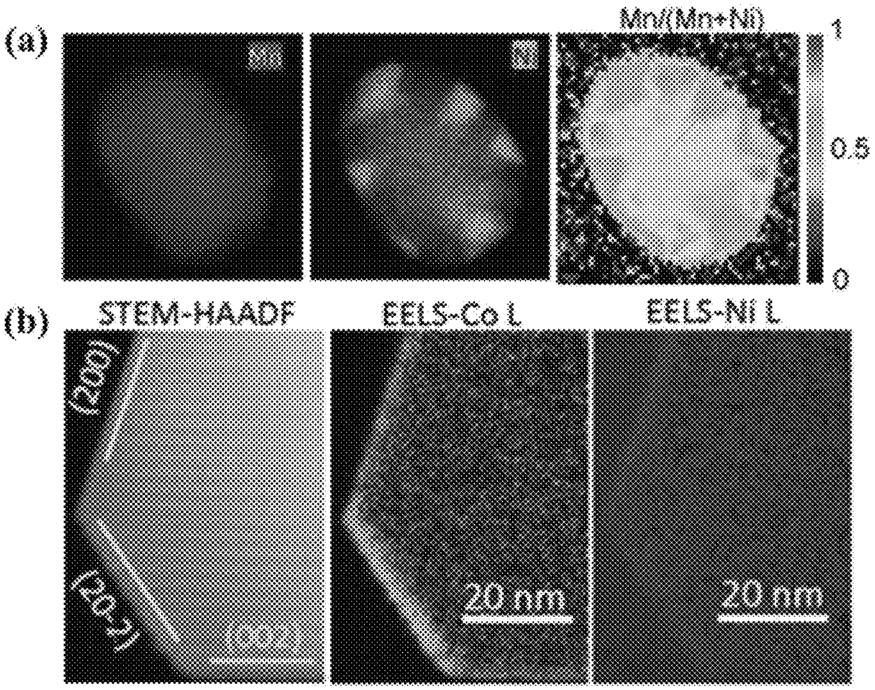
FIG. 7A Prior Art
FIG. 7A is a tunneling electron microscopy (TEN) atomic map micrograph of a prior art LRMO material that was not subjected to rapid quenching prior to electrochemically cycling the material.

FIG. 7A is a prior art example from the literature (H. Zheng, et al., "Recent developments and challenges of Li-rich Mn-based cathode materials for high-energy lithium-ion batteries", Materials Energy Today, Volume 18, December 2020, Page 100518) of tunneling electron microscopy (TEN) high-angle annular dark-field imaging (HAADF) atomic map micrograph of typical LRMO material that has not been subjected to rapid quenching prior to electrochemically cycling the material. As can be seen from these micrographs, the initial LRMO) material had significant nickel and manganese segregation inside the particles.

Figure 7B:
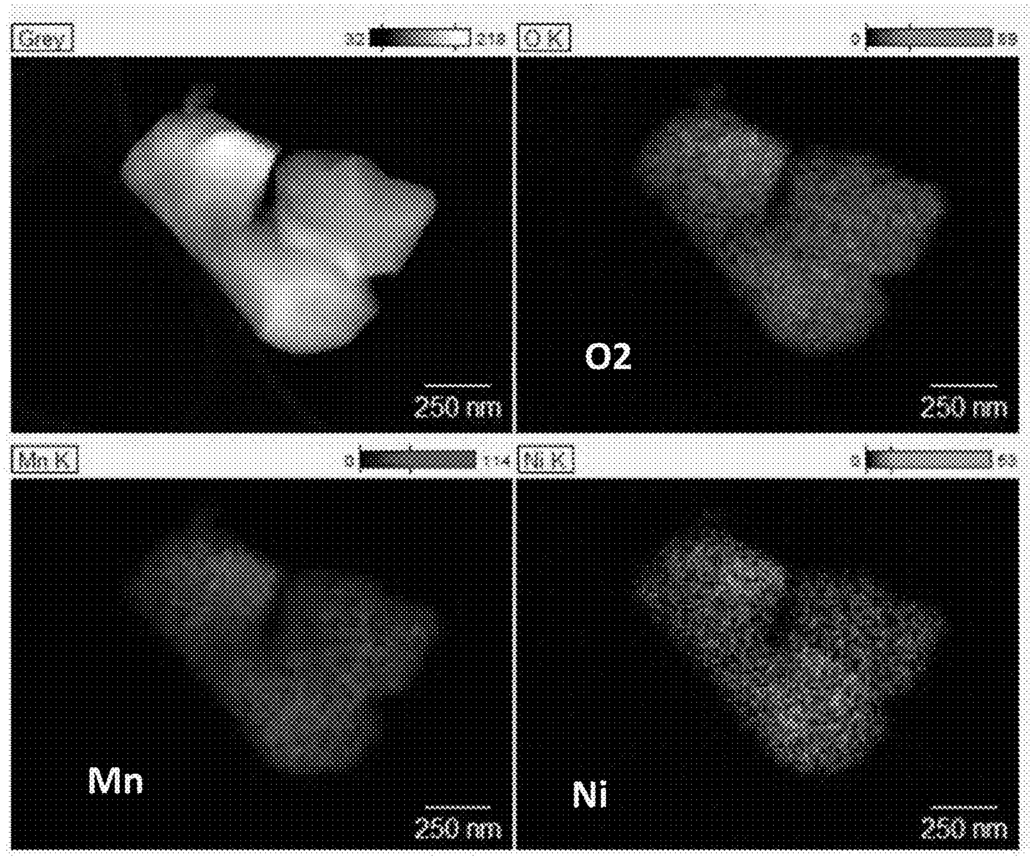
FIG. 7B is a TEM HAADF atomic map micrograph of a LRMO material that was subjected to rapid quenching prior to electrochemically cycling the material, according to various embodiments of the present disclosure.

FIG. 7B is a TEM HAADF atomic map micrograph of produced LRMO material that was subjected to rapid quenching prior to electrochemically cycling the material, according to various embodiments of the present disclosure. As can be seen from these micrographs, the LRMO material had no significant nickel/manganese segregation in the particle. Thus, the rapid or ultra-rapid quenching reduces or eliminates the nickel segregation to the surface of the particles, and nickel and manganese are evenly mixed in the bulk of the LRMO material.

Crystalline Uniformity, Cation Disorder, and Surface Passivation

One method to assess the degree of metal cation disorder in the materials is to use the ratio of peak intensities in the x-ray diffraction patterns. Specifically, the ratio of the intensity of the (003) peak to the (104) peak is commonly known as rough measurement of electrochemical activity in mixed cation materials with this predominately layered crystal structure, while the ratio of the sum of the intensities of (006) and (102) peaks to the intensity of the (101) peak is an indicator of cation disorder. Based on this, the material that has been both microwave-processed during the decomposition stage and then ultra-rapidly quenched offers significantly higher indications of electrochemical activity and lower degree of cation order (and therefore a higher degree of cation disorder) than slow cooled material.

TABLE 2

| XRD Peak Ratios | | |
|---|---|---|
| | (003)/(104): higher is more electrochemically active | [(006) + (102)]/(101): higher is higher cation mixing/disorder |
| Comparative example: slow cooling | 2.79 | 0.318 |
| Example: ultra-rapid quenching | 2.575 | 0.346 |

Table 2 shows XRD peak intensity ratios for a comparative example LRMO material subjected to a slow quench after sintering (row 1), and for an exemplary LRMO material made subjected to the ultra-rapid quench after sintering (row 2). Both materials have formula $Li_x(Mn_yNi_{1-y})_{2-x}O_2$ where x=1.2, and y=0.75. Importantly, the exemplary ultra-rapidly quenched material exhibits XRD characteristics that show an increase in atomic disordering in the material that have significantly higher electrochemical activity and more cation disorder/metal oxide homogeneity than the comparative example material. Specifically, the exemplary material shows an increase in the ratio of the sum of the intensities of (006) and (102) peaks to the intensity of the (101) peak, in this case of about 9%. This significant increase in cation disorder represents a situation where the Ni and Mn atoms are more completely mixed (and are therefore not grouped) in the material. For this reason, such exemplary material may be referred to as "cation-disordered lithium-rich lithium manganese nickel oxide", and these data demonstrate that different states of matter can be created based on the processing conditions used, and in particular, the rate of cooling used.

Electrochemical Testing

Synthesized cathode materials were mixed with Super-P carbon black and polyvinylidene fluoride (PVDF) in a ratio of 8:1.2:0.8 making the active material 80% of the overall mass. The resultant blend was then mixed into ~15 ml of N-Methyl-2-Pyrrolidone for a minimum of one hour before two 10-minute sonication steps, after which the resultant slurry was further allowed to mix on a hot plate at 100° C. for a minimum of 30 minutes before being spray coated onto 10×10 cm, 10 μm thick aluminum foil heated above 100° C. Foil was allowed to dry in a 70° C. oven in air over night before being punched out with a biopsy punch. These punches were then used to make 2032 coin cells that used lithium foil as the anode, 1.0 M $LiPF_6$ 50/50 ethylene carbonate/dimethyl carbonate solution as the electrolyte, a Celgard battery separator, 0.5 mm stainless steel spacers, and wave springs on the cathode side to ensure mechanical contact within the cell; each coin cell was assembled and sealed through use of a coin cell press in a dry low oxygen argon atmosphere.

The electrochemical performance investigations used low-current Neware or bio-logic battery testers to conduct potential limited galvanostatic testing with constant current on the coin cells made in the process described above. The cells were cycled using constant current charge/discharge conditions at rates ranging from C/20 to C/2 between 4.8 and 2 V.

Figure 8A:
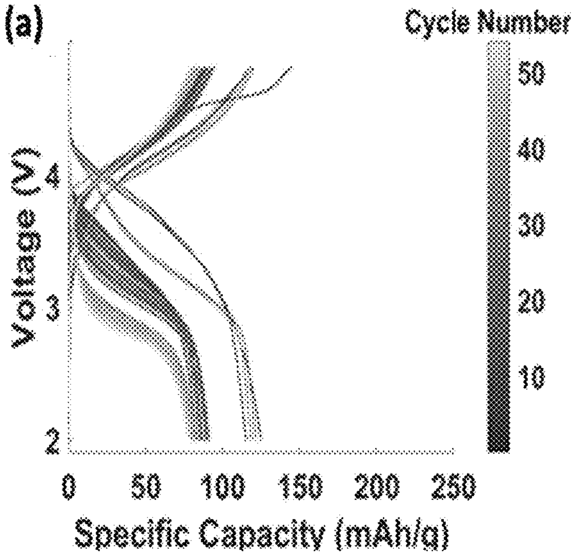
FIG. 8A is a graph showing cell potential vs. specific capacity.
Figure 8B:
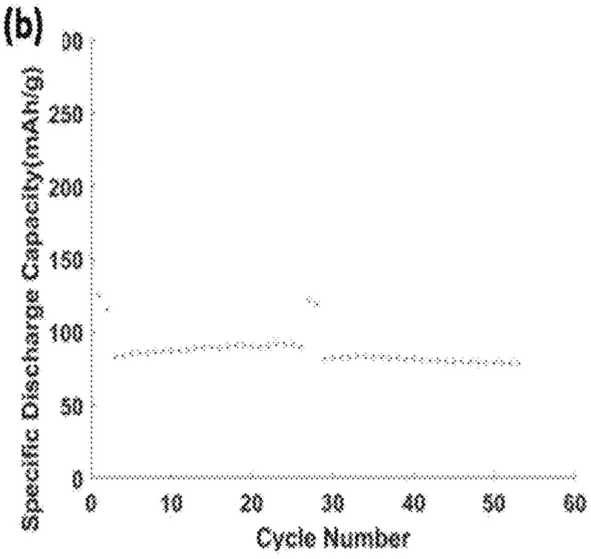
FIG. 8B is a graph of the specific capacity vs cycle for a comparative example of a $Li_x(Mn_yNi_{1-y})_{2-x}O_2$ material, where x=1.16, and y=0.7, that was neither microwave processed nor rapid quenched (in this case cooled relatively slowly on a metal plate).

FIG. 8A is a graph showing cell potential vs. specific capacity, and FIG. 8B is a graph of the specific capacity vs cycle for a comparative example of a LRMO material ($Li_x(Mn_yNi_{1-y})_{2-x}O_2$, where x=1.16, and y=0.7) that was not microwave processed or rapidly quenched (in this case cooled relatively slowly on a metal plate).

Referring to FIGS. 8A and 8B, it can be seen that the slow cooled material had poor capacity and capacity retention. After 50 full charge/discharge (C/2 rate) cycles, this material yielded specific capacity of 120 mAh/g at a C/20 rate, which is far below the theoretical performance of this material. Further, there was substantial voltage fade in the material, where the average discharge potential was below 3V after 30 cycles.

Figure 9A:
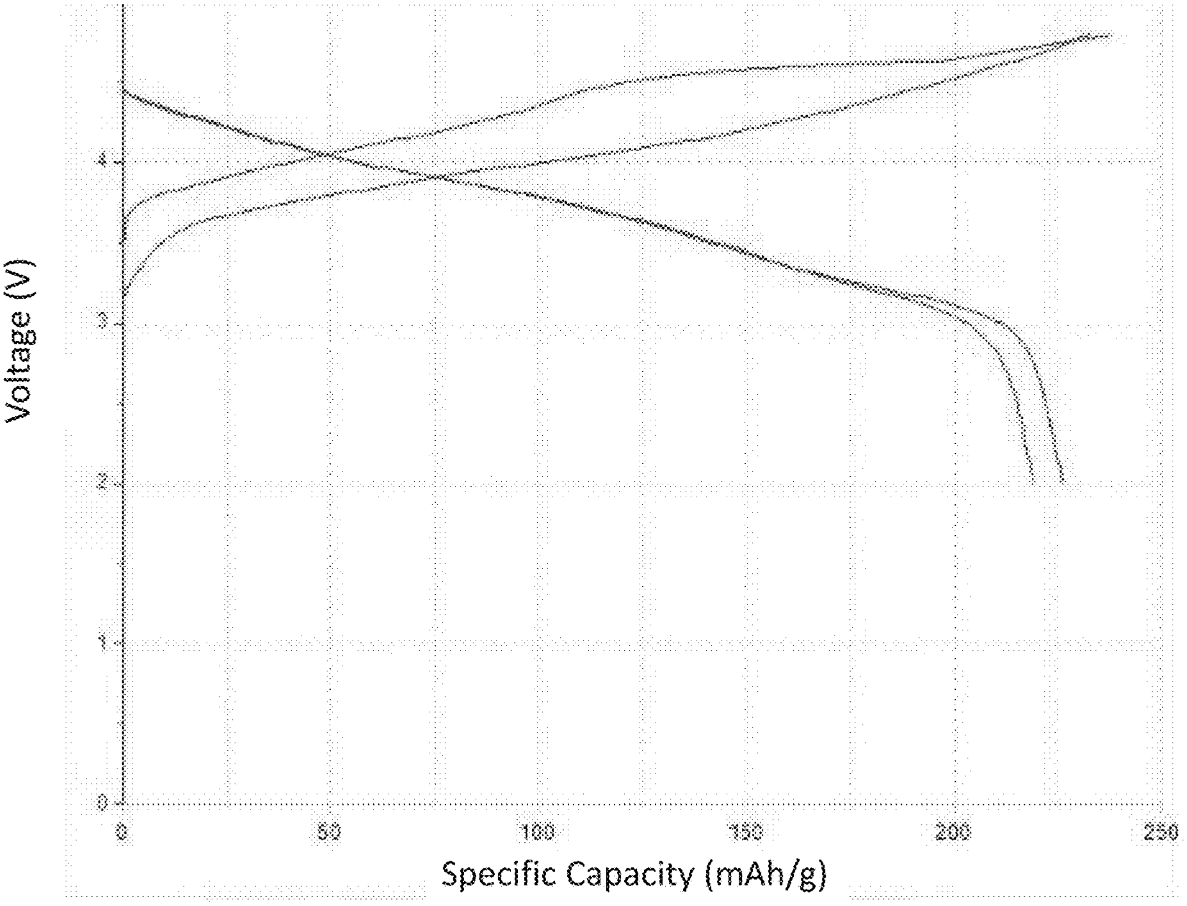
FIG. 9A is a graph showing cell potential vs. specific capacity during break-in cycles.
Figure 9C:
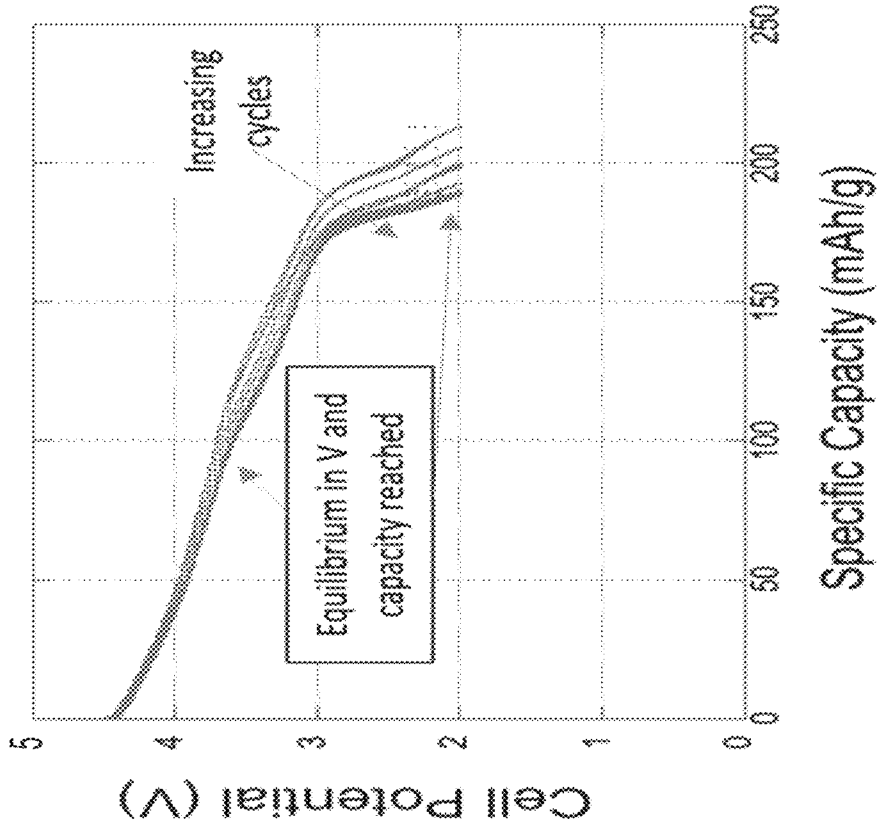
FIG. 9C is a graph showing specific capacity vs cycle at C/20 rate.
Figure 9B:
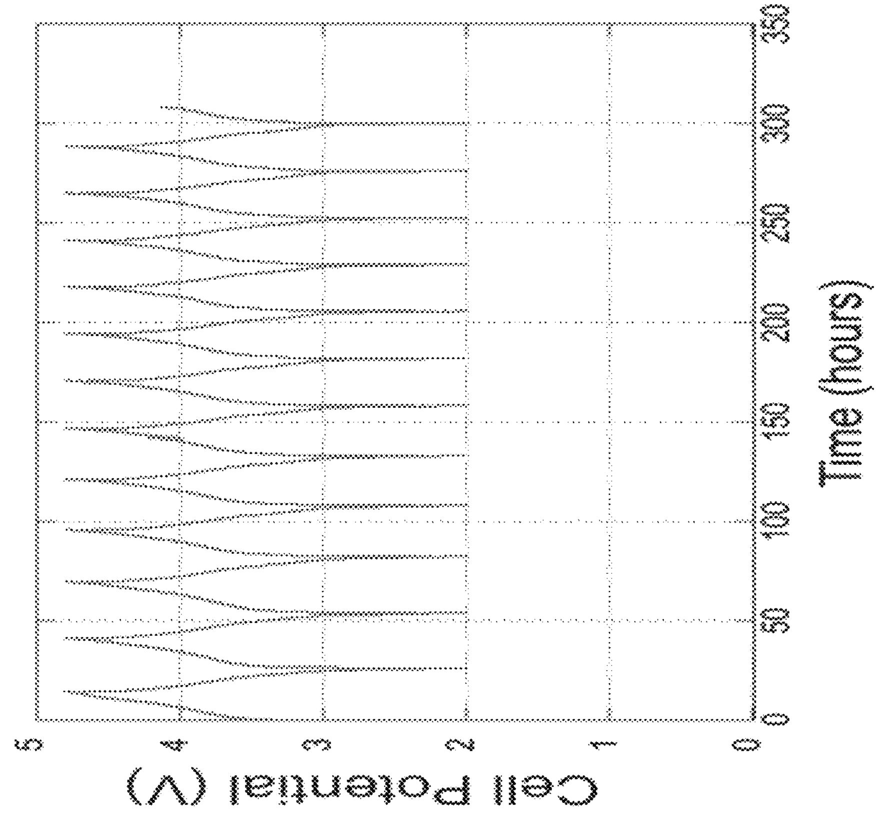
FIG. 9B is a graph showing cell potential vs specific capacity over time.
Figure 9D:
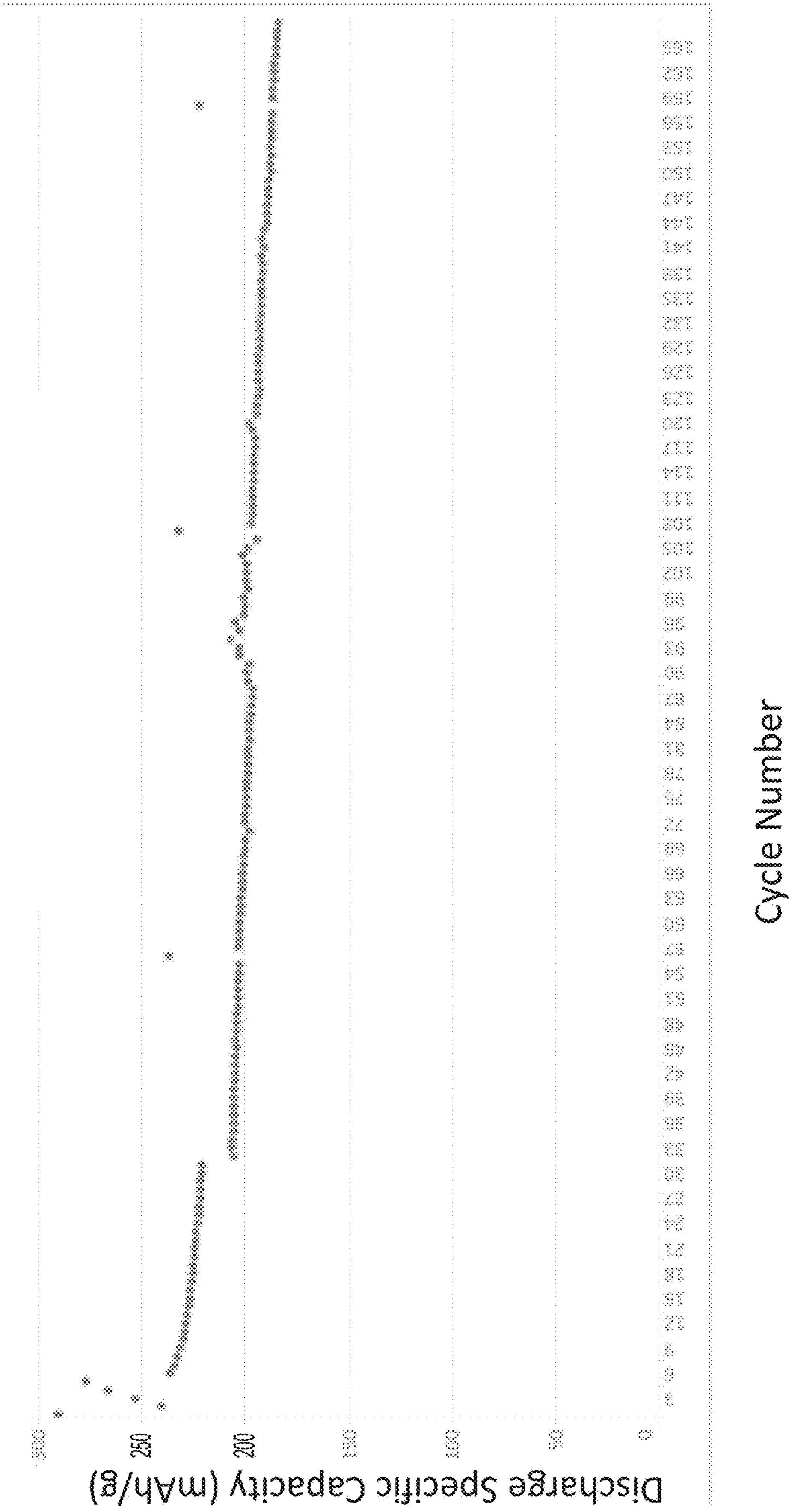
FIG. 9D is a graph showing discharge specific capacity at C/5 rate with C/20 reference cycles vs cycle number for exemplary cells including LRMO active materials according to various embodiments of the present disclosure.

FIG. 9A is a graph showing cell potential vs. specific capacity during break-in cycles of ultra-rapidly quenched material, FIG. 9B is a graph showing cell potential vs specific capacity over time of ultra-rapidly quenched material, and FIG. 9C is a graph showing specific capacity vs cycle at C/20 rates over multiple cycles, for exemplary cells including LRMO active materials according to various embodiments of the present disclosure. FIG. 9D is long term cycling of the exemplary LRMO material that shows that the material exhibits a less than 10% capacity fade of all three C/20 reference cycles, after over 150 C/5 cycles (which occur at cycles 56, 107, and 158).

In contrast to the comparative exemplary material shown in FIGS. 8A-8B, the exemplary LRMO cathode material made using an ultra-rapid quench performed well, as shown in FIGS. 9A-9C. The electrochemical performance data in FIGS. 9A and 9B demonstrates both that: (a) highly functional materials can be produced at meaningful scale, and that (b) these materials have performance properties that meet or exceed the much smaller batches produced. Notably, the voltage profile has an exaugurated and desirable inflection after approximately 100 mAh/g of discharge capacity compared to the materials made using slower cooling methods. The voltage trace above this inflection point demonstrates virtually no "sag" or loss during cycling, which is improved compared to materials made using the slower transfer technique. This suggests that the ultra-rapid cooling approach implemented using a gravity-driven transfer from the furnace to the quench environment in under 200 milliseconds is desirable when combined with rapidly decomposed precursors via microwave irradiation.

Figure 10A:
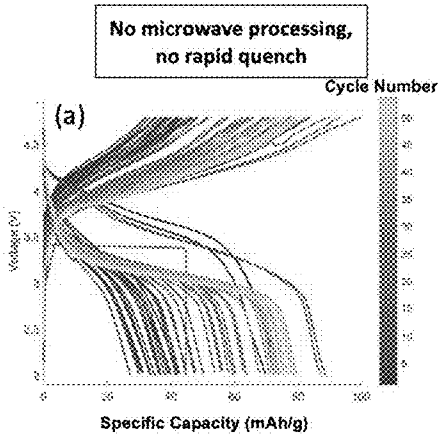
FIG. 10A is a graph showing cell potential vs specific capacity for a comparative cell including a $Li_x(Mn_yNi_{1-y})_{2-x}O_2$ active material, where x=1.16, and y=0.7, that was not microwave processed or rapid quenched.
Figure 10B:
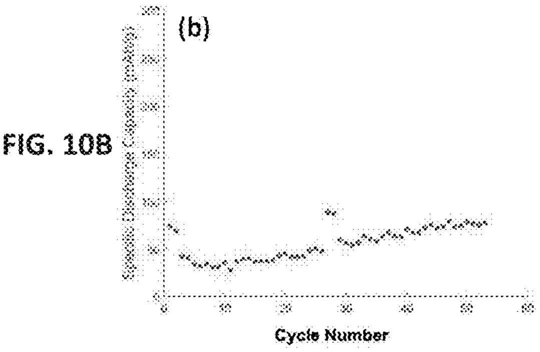
FIG. 10B is a graph showing a specific capacity vs cycle for the cell of FIG. 10A.
Figure 10C:
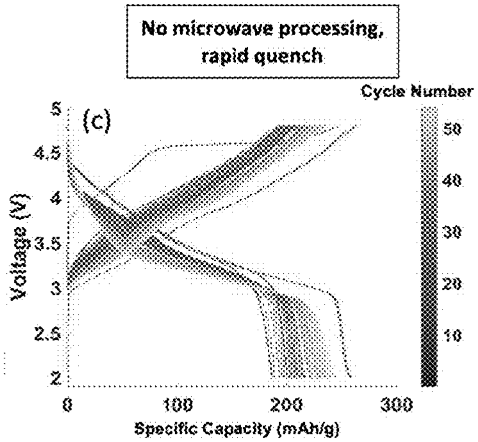
FIG. 10C is a graph showing cell potential vs specific capacity for an exemplary cell including a $Li_x(Mn_yNi_{1-y})_{2-x}O_2$ active material, where x=1.16, and y=0.7 that was rapidly water quenched.
Figure 10D:
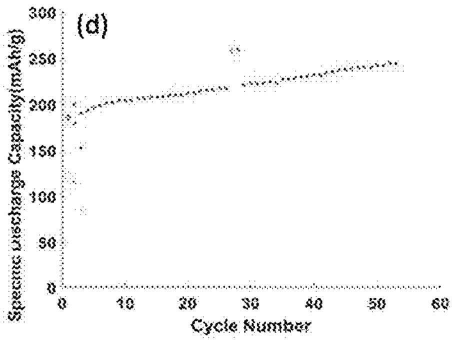
FIG. 10D is a graph showing a specific capacity vs cycle for the cell of FIG. 10C.

FIG. 10A is a graph showing cell potential vs specific capacity of a comparative cell including an LRMO active material ($Li_x(Mn_yNi_{1-y})_{2-x}O_2$, where x=1.16, and y=0.7) that was not microwave processed or rapid quenched, FIG. 10B is a graph showing a specific capacity vs cycle number for the cell of FIG. 10A, FIG. 10C is a graph showing cell potential vs specific capacity for an exemplary cell including a water quenched LRMO active material ($Li_x(Mn_yNi_{1-y})_{2-x}O_2$, where x=1.16, and y=0.7) that was not ultra-rapidly quenched (the material was removed from the furnace environment and not quenched for multiple seconds) for the first and 50th C/2 discharge cycles, and FIG. 10D is a graph showing specific capacity vs. cycle number of the cell of FIG. 10C. Neither active material was microwave processed.

Both comparative and exemplary cells were cycled twice with both charge and discharge currents at a rate of approximately C/20 to condition the cathode material. Subsequent to this, 25 cycles were performed with charge rates of C/20 and discharge rates of C/2. This set of 27 cycles is referred to as a round of cycling, and all cells experienced this regime twice. As can be seen from FIGS. 10A-10D, the rapidly quenched exemplary material has improved capacity and capacity retention relative to that of the comparative material. After 50 full charge/discharge cycles, the exemplary material yields specific capacity of nearly 230 mAh/g at a C/2 rate, which is far better than the comparative which exhibited a much lower capacity and lower average discharge voltage. Thus, the exemplary material, a) showed a significant increase in capacity over 50 cycles, (b) did not exhibit the commonly reported excessive voltage fade (wherein the average discharge voltage of the cell decreases significantly overuse), and (c) exceed 250 mAh/g at a C/20 discharge rate after 25 cycles and over 230 mAh (at a C/2 rate) after 50 cycles with less than 10% loss in average voltage during discharge. The specific capacity increases by 20 to 25% over 50 full C/20-C/2 charge/discharge cycles. In contrast, the comparative material had much lower performance, including sub-100 mAh/g specific capacity values.

Figure 11B:
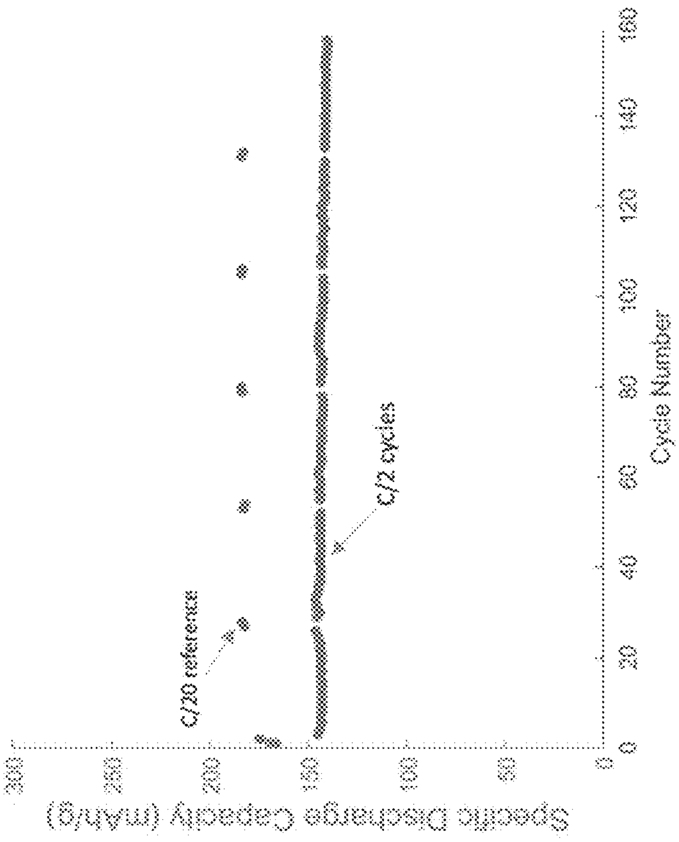
FIG. 11B is a graph showing the specific discharge capacity vs cycle at C/20 and C/2 rates of the cell of FIG. 11A, according to various embodiments of the present disclosure.
Figure 11A:
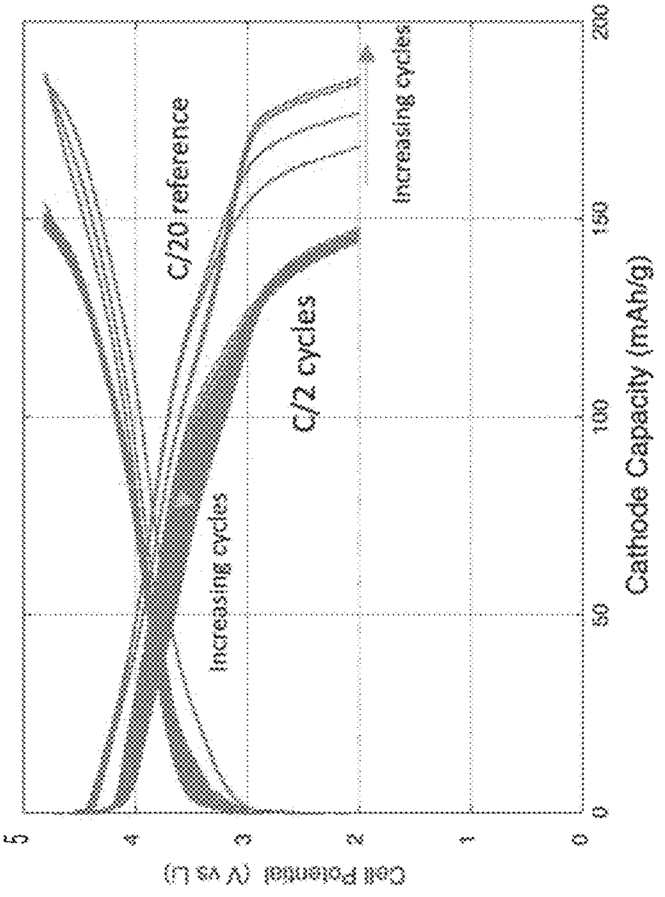
FIG. 11A is a graph showing cell potential vs specific capacity of an exemplary cell including a $Li_x(Mn_yNi_{1-y})_{2-x}O_2$ active material, where x=1.16, and y=0.7, that was microwave decomposed and rapidly quenched.

FIG. 11A is a graph showing cell potential vs specific capacity of an exemplary cell including a $Li_x(Mn_yNi_{1-y})_{2-x}O_2$ active material, where x=1.16, and y=0.7, that was microwave decomposed and rapidly quenched, and FIG. 11B is a graph showing the specific discharge capacity vs cycle at C/20 and C/2 rates of the exemplary cell of FIG. 11A, according to various embodiments of the present disclosure.

Thus, as shown in FIGS. 11A-11B, combining the microwave decomposition process with a rapid thermal quenching results in material that offers even more electrochemical stability. The combined microwave processing and rapid quench method results in a greatly reduced voltage sag compared to that of the material of the comparative cell, and stable discharge capacity over ~200 cycles (at which point the coin cell test fixture in use failed).

Synthesized LRMO active material (i.e., the sintered and quenched loose powder) was mixed with Super-P carbon black and polyvinylidene fluoride (PVDF) in a ratio of 8:1.2:0.8 making the active LRMO 80% of the overall mass. The resultant blend was then mixed into about 15 ml of N-methyl-2-pyrrolidone, for a minimum of one hour. Two 10-minute sonication steps were then performed, after which the resultant slurry was further allowed to mix on a hot plate at 100° C., for a minimum of 30 minutes, before being spray-coated onto 10×10 cm, 10 m thick aluminum foil heated above 100° C. The foil was allowed to dry in a 70° C. oven in air over night before being sampled into round electrode discs. The resultant punches were then used to make 2032-type coin cells that included lithium foil anodes, 1.0 M LiPF6 50/50 ethylene carbonate/dimethyl carbonate solution as the electrolyte, a Celgard battery separator, 0.5 mm stainless steel spacers, and wave springs on the cathode side to ensure mechanical contact within the cell. Each coin cell was assembled and sealed through use of a coin cell press in a dry low oxygen argon atmosphere.

A LAND battery tester was used to conduct potential limited galvanostatic testing with constant current on the coin cells made in the process described above. A minimum of three cells, per variant, were cycled at ambient temperatures between 2.0 V and 4.8 V. Cells were cycled twice with both charge and discharge currents at a rate of approximately C/20 to condition the cathode material. The cells were then charged and discharged for 25 cycles at a C/20 charge rate and a C/2 discharge rate. These 27 cycles may be referred to as a round of cycling, and all cells experienced two rounds of cycling.

Figure 12A:
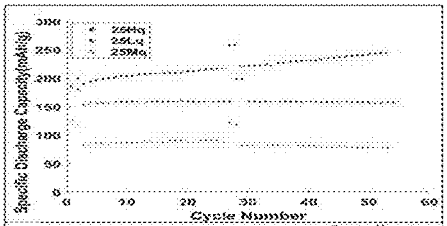
FIG. 12A is a graph showing the specific discharge capacities of lithium-rich nickel manganese oxide material samples having a formula $Li[Ni_xLi_{(1/3-2x/3)}Mn_{(2/3-x/3)}]O_2$ where the nickel content, x=0.25, over the course of cycling.
Figure 12B:
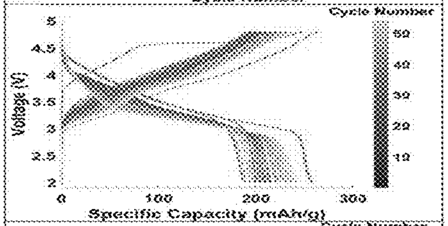
FIGS. 12B-12D show full charge and discharge curves of coin cells respectively including 25Hq, 25Lq, and 25Mq samples.
Figure 12C:
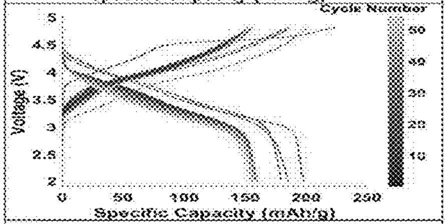
Figure 12D:
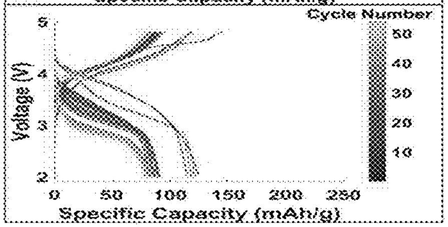
Figure 13A:
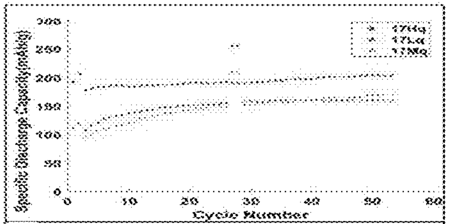
FIG. 13A is a graph showing the specific discharge capacities of x=0.17 samples over the course of cycling.
Figure 13B:
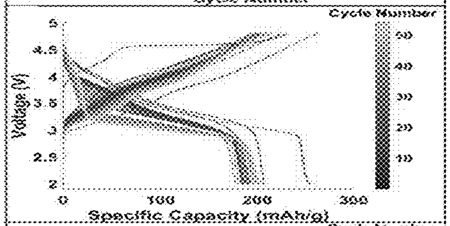
FIGS. 13B-13D show full charge and discharge curves of coin cells respectively including 17Hq, 17Lq, and 17Mq samples.
Figure 13C:
Figure 13D:
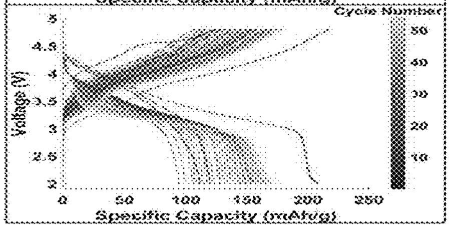
Figure 14A:
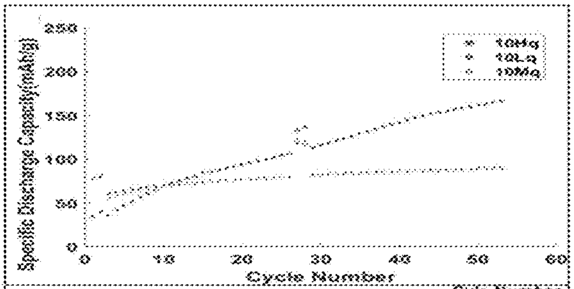
FIG. 14A is a graph showing the specific discharge capacities of x=0.10 samples over the course of cycling.
Figure 14B:
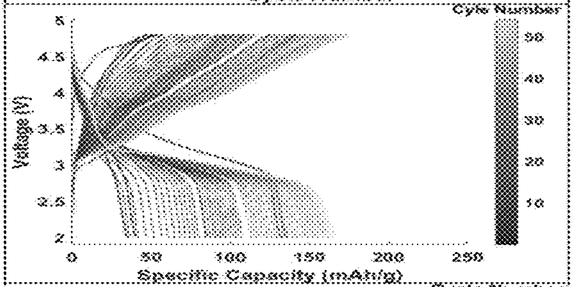
FIGS. 14B-14D show full charge and discharge curves of coin cells respectively including 10Hq, 10Lq, and 10Mq samples.
Figure 14C:
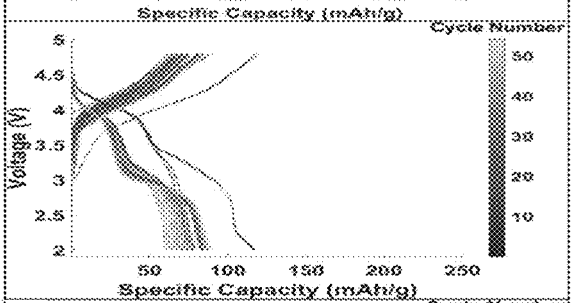
Figure 14D:
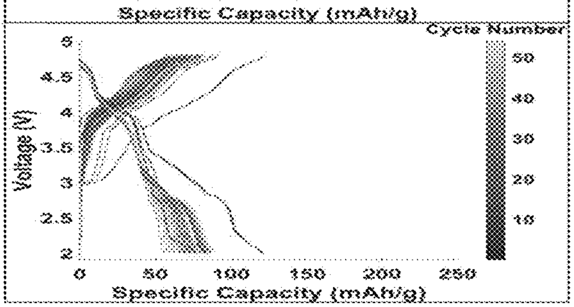
Figure 15A:
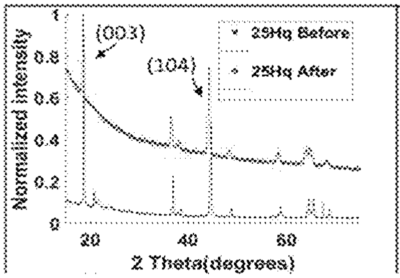
FIGS. 15A-15I are graphs showing normalized and offset XRD patterns of LLRNMO powders before and after cycling, respectively for 25Hq, 25Lq, 25Mq, 17Hq, 17Lq, 17Mq, 10Hq, 10Lq, and 10Mq samples.
Figure 15B:
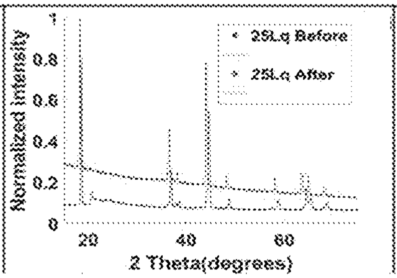
Figure 15C:
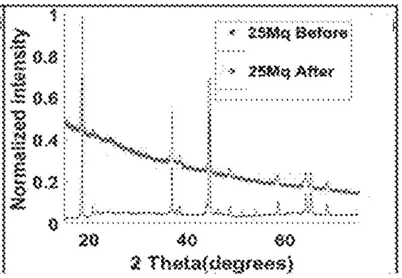
Figure 15D:
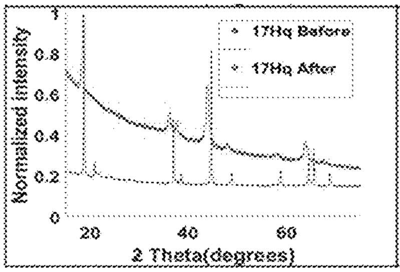
Figure 15E:
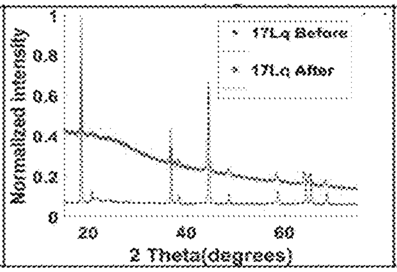
Figure 15F:
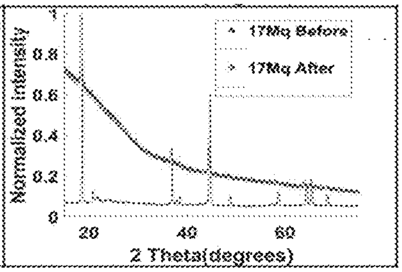
Figure 15G:
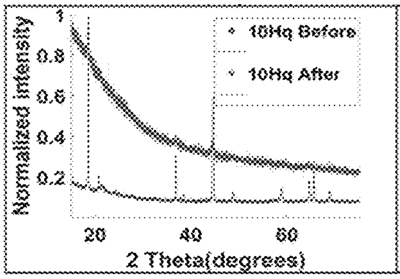
Figure 15H:
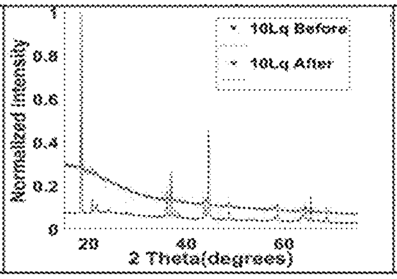
Figure 15I:
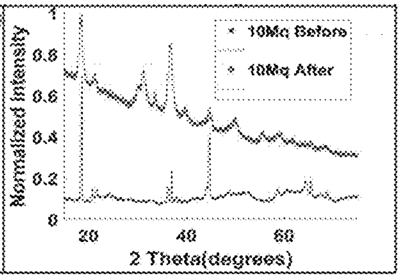

FIG. 12A is a graph showing the specific discharge capacities of x=0.25 samples (i.e., $Li[Ni_xLi_{(1/3-2x/3)}Mn_{(2/3-x/3)}]O_2$ samples, where x=0.25) over the course of cycling, and FIGS. 12B-12D show full charge and discharge curves of coin cells respectively including 25Hq, 25Lq, and 25Mq samples. FIG. 13A is a graph showing the specific discharge capacities of x=0.17 samples over the course of cycling, and FIGS. 13B-13C show full charge and discharge curves of coin cells respectively including 17Hq, 17Lq, and 17Mq samples. FIG. 14A is a graph showing the specific discharge capacities of x=0.10 samples over the course of cycling, and FIGS. 14B-14C show full charge and discharge curves of coin cells respectively including 10Hq, 10Lq, and 10Mq samples.

The following Table III shows the discharge capacities (DC) of the samples over the course of cycling, along with the C/20:C/2 ratio of DC28/DC27. Rate ability was accessed by taking the ratio of a C/20 discharge capacity and a C/2 discharge capacity, such the discharge capacities of the 27th and 28th cycles. Note discharge cycles 1, 2, and 28 were at a C/20 rate, while discharge cycles 3, 27, and 54 were at a C/2 rate.

TABLE III

| | Discharge Capacities (mAH $g^{-1}$) | | | | | | |
|---|---|---|---|---|---|---|---|
| | DC1 | DC2 | DC3 | DC27 | DC28 | DC54 | (C/20):C/2) DC28/DC27 |
| 25Hq | 186 | 200 | 190 | 217 | 258 | 245 | 1.19 |
| 25Lq | 180 | 175 | 152 | 160 | 200 | 160 | 1.25 |
| 25Mq | 127 | 120 | 80 | 90 | 125 | 75 | 1.39 |
| 17Hq | 195 | 205 | 175 | 197 | 255 | 205 | 1.29 |
| 17Lq | 110 | 120 | 107 | 150 | 190 | 160 | 1.27 |
| 17Mq | 110 | 120 | 90 | 150 | 210 | 170 | 1.40 |
| 10Hq | 35 | 40 | 37 | 110 | 140 | 165 | 1.27 |
| 10Lq | 75 | 77 | 60 | 75 | 120 | 87 | 1.60 |
| 10Mq | 75 | 80 | 55 | 75 | 125 | 90 | 1.67 |

Referring to FIGS. 12A-12C, the x=25 samples which were synthesized with differing quenching methods, exhibited a different relative embodied charge capacity in their first-charge 4.5 V plateaus. Specifically, the 25Hq's plateau accounted for 60.7% of initial charge capacity, 25Lq's accounted for 44.4%, and 25Mq's only accounted for 34.5% of specific capacity.

The initial capacity of 25Hq had the highest initial capacity of the x=0.25 samples with 186 mAh $g^{-1}$ and 25Mq has the lowest with 127 mAh $g^{-1}$. As seen in Table III, all x=0.25 samples saw improved capacities over the course of cycling, except for the 25Mq sample. 25Hq saw the largest capacity increase of all three samples. The 25Mq sample also displays severe voltage decay with the voltage dropping below 3 V over the course of cycling. While the 25Hq and 25Lq samples also had inflection points on their discharge curves at 2.8 V, theirs do not display such a severe voltage fade. The voltage decay was not seen in the C/20 discharges of the 25Hq and 25Lq samples, however the 25Mq sample's C/20 discharges experienced voltage decay. The average discharge voltage of the 0.25 samples reflects these voltage fades with 25Mq having the lowest average voltage over the course of cycling, and 25Lq having slightly higher average discharge voltages than 25Hq.

With regard to rate capability, as seen in Table III, the C/20:C/2 ratios for 25Hq, 25Lq, and 25Mq samples are 1.19, 1.25, and 1.39, respectively.

Referring to FIGS. 13A-13D, the charge profiles of x=0.17 samples had a more classical single flat 4.5 V plateau on the first charge that accounts for roughly 56.8% of initial charge capacity, while the 17Lq and 17Mq samples displayed less defined 4.5 V plateaus that accounted for roughly 20% of initial charge capacity in both cases.

The capacity of all x=0.17 samples increased between the first two C/20 discharges by roughly 10 mAh $g^{-1}$. As seen in Table III, the second round of C/20 discharges saw capacity increases of 31%, 73% and 91% for 17Hq, 17Lq, and 17Mq, respectively. There was near uniform voltage decay behavior for all three samples and average plateau voltages fell around 0.4 V over the course the cycling. However, the voltage decay was not seen in these samples' C/20 discharge curves. The x=0.17 samples also have similar average discharge voltages over time. The main difference is how over the first round of cycling the 17Mq's average voltage increases, but by the 2nd round of cycling it matches the voltage fade tend of 17Hq and 17Lq.

Referring to FIGS. 14A-14D, with regard to the charge profiles of x=0.10 samples, the 10Hq charge profile is different from the 10Lq and 10Mq samples, which have similar profiles. Only the 10Hq sample had a defined 4.5 V plateau, although all three samples had persistent inflection points at 4.5 V, with 10Hq's disappearing and the 10Lq and 10Mq samples' persisting to the 54th cycle. The 10Mq sample's inflection points were the most pronounced.

As seen in Table III, all of the x=0.10 samples experienced initial capacity increases during the first C/20 cycles on the order of 5 mAh g-1, followed by 300%, 60% and 67% improvement in capacity on the second round of C/20 discharges for 10Hq, 10Lq, and 10Mq samples, respectively. By the end of the first round of C/2 discharging, the capacities of all x=0.10 samples exceeded or caught up to the initial C/20 capacities. Over the course of the 2 rounds of C/2 discharging, 10Hq saw capacity increases of 197% and 50%, 10Lq saw capacity increases of 25% and 16%, and 10Mq saw increases of 36% and 20%, over the course of the first and second rounds respectively. The discharge plateau of the 10Lq and 10Mq samples started at ~3.0 V while the plateau for the 10Hq sample started at 3.2 V; the voltage behavior of 10Hq of the course of cycling was different than 10Lq and 10Mq. The voltage behaviors of all the x=0.10 samples were rate dependent, and the average discharge voltage of all three samples' C/20 discharges increased over the course of cycling. However, the 10Lq and 10Mq samples' C/2 discharges showed signs of voltage decay, while 10Hq's did not.

Additionally, the 10Lq and 10Mq samples had an inflection point at 2.2 V that is only present on the C/20 discharge curves. These voltage behaviors of the x=0.10 samples showed average discharge voltages of the 10Lq and 10Mq samples are higher than 10Hq's, but also display a greater degree of voltage fade.

With regard to rate capability, as shown in Table III, the 10Hq, 10Lq, and 10Mq samples C/20:C/2 ratios of 1.27, 1.60, and 1.67, respectively. It is noted that the effective charge and discharge for each cycle also evolves significantly with cycling, which makes the DC28/DC27 ratio for 10Hq effectively a C/10:C/1 ratio.

Varied phase transformation over the course of testing was manifested in the voltage profiles observed during cycling. The expected voltage plateaus seen in the x=0.25 samples suggest that the expected classical phase transformation occurred.

FIGS. 15A-15I are graphs showing normalized and offset XRD patterns of LRMO powders before and after cycling, respectively for 25Hq, 25Lq, 25Mq, 17Hq, 17Lq, 17Mq, 10Hq, 10Lq, and 10Mq samples.

Referring to FIGS. 15A-15I, the XRD patterns of all x=0.25 samples after cycling, the 2θ=220 superlattice peaks are lost, indicating that there must have been migration of the transition metals to equilibrate the structure. However, all other R-3m indexed peaks remained, suggesting the overall structure was preserved. Similar results can be seen in the x=0.17 and 10Hq samples. This loss of the transition metal ordering is linked to oxygen and lithium loss and thus decreased capacity, whereas the increases in capacity seen in FIGS. 12A-14C demonstrate that this is not the case for these samples. These data therefore suggest that the migration of the transition metals does not always give rise to capacity losses.

The 10Mq sample had substantially different crystal structure after cycle testing, though both 10Mq and 10Lq samples still had some visible peaks at 22°, further suggesting that the electrochemical phase transformations seen in FIGS. 14A-14C were not the same as those transformation seen in the cycling data of FIGS. 12A-13C. The alternative phase transformations seen in 10Lq and 10Mq suggest a synthetic limit for LRMO existing somewhere 0.17>x>0.10 nickel content.

Figure 16:
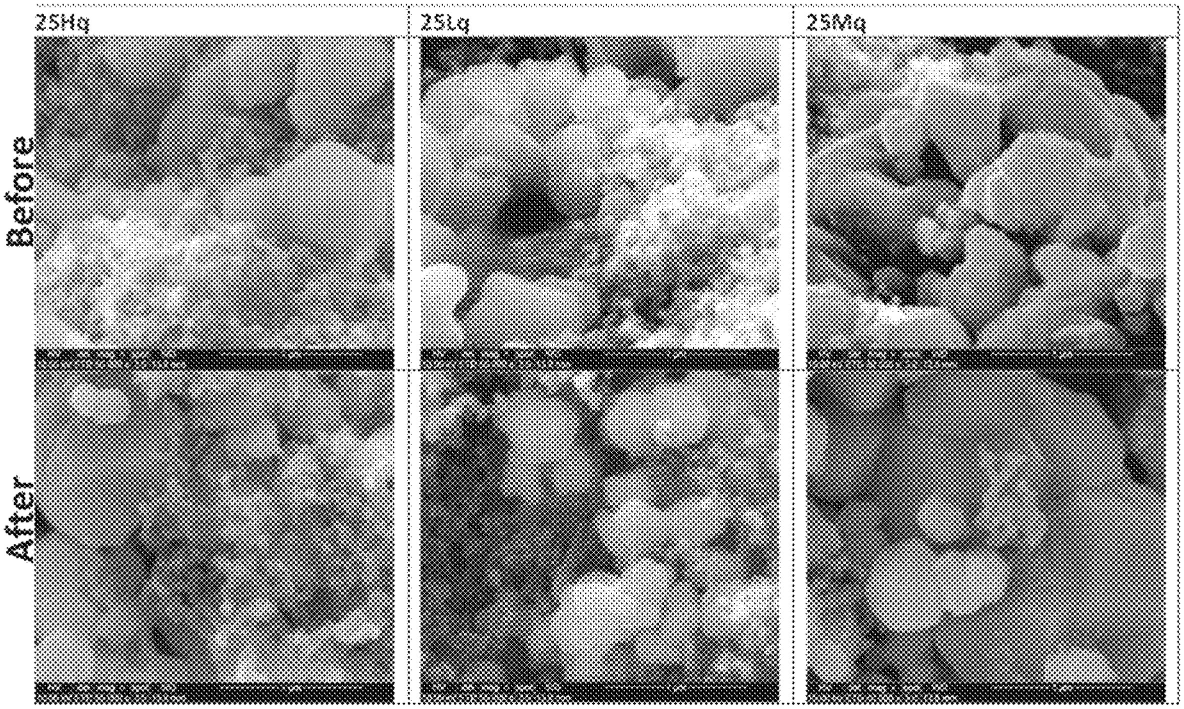
FIG. 16 includes SEM micrographs at 50 k× of cathodes spray coated with 25Hq, 25Lq and 25Mq samples, before and after cycling.
Figure 17:
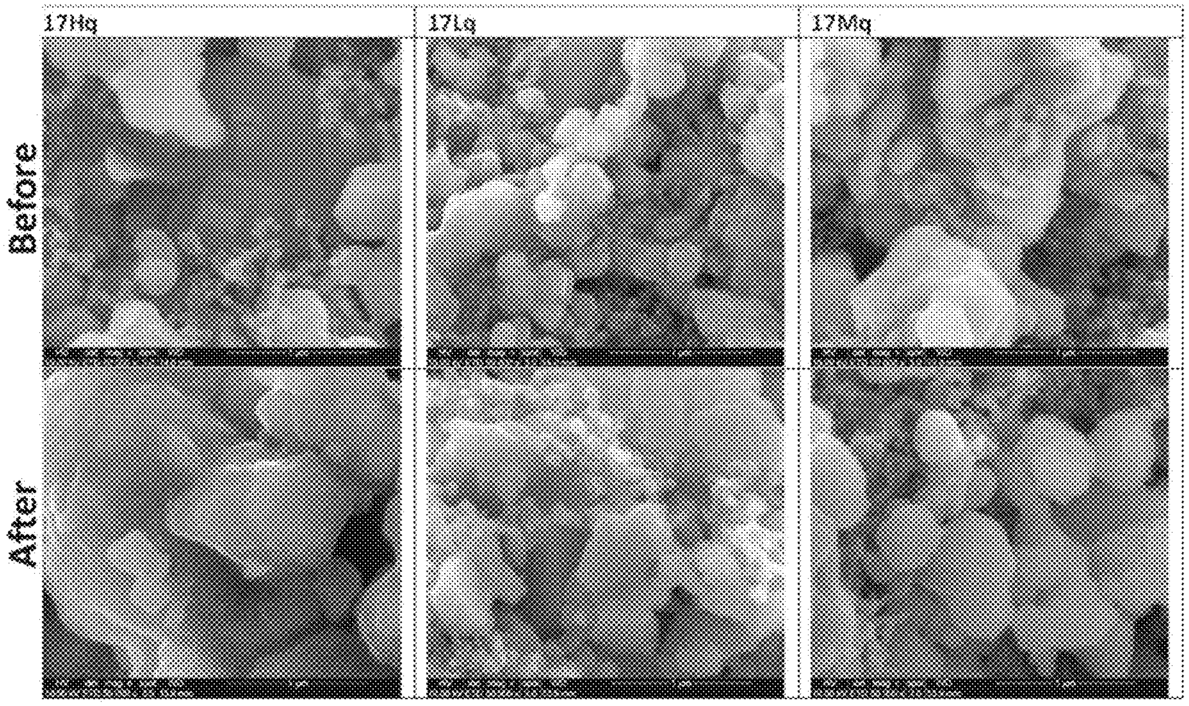
FIG. 17 includes SEM micrographs at 50 k× of cathodes spray coated with 17Hq, 17Lq, and 17Mq samples, before and after cycling.
Figure 18:
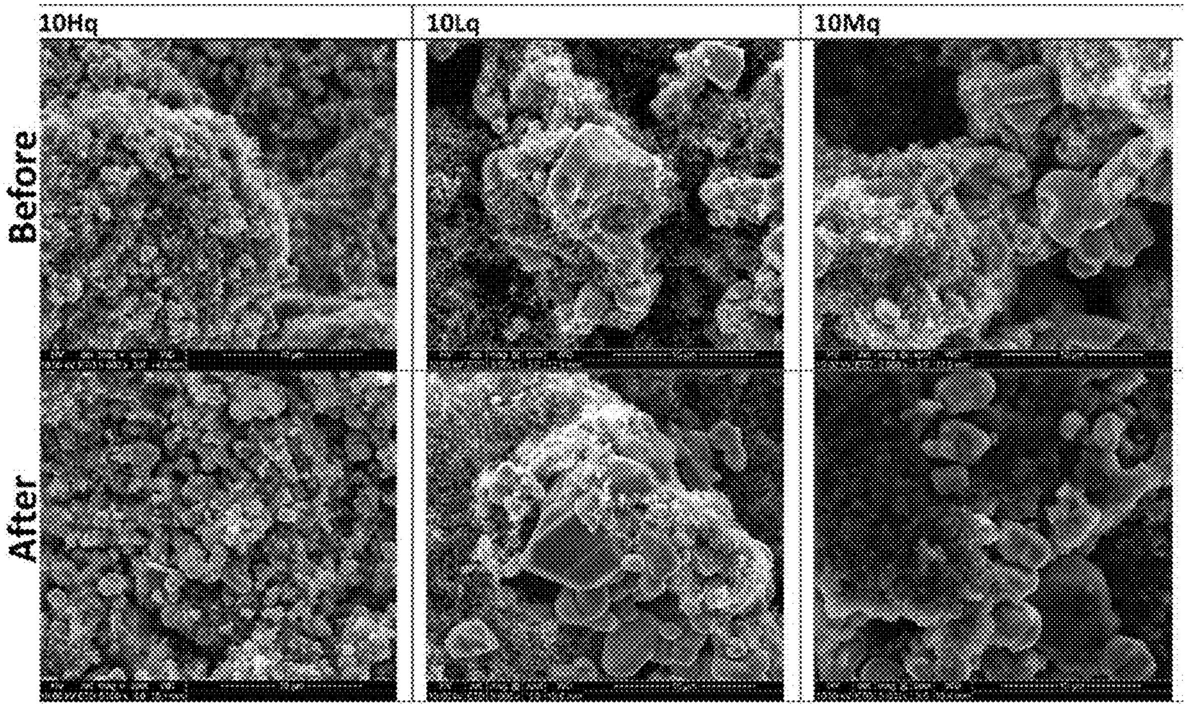
FIG. 18 includes SEM micrographs at 5 k× of cathodes spray coated with 10Hq, 10Lq, and 10Mq samples, before and after cycling.

FIG. 16 includes SEM micrographs at 50 k× of cathodes spray coated with 25Hq, 25Lq and 25Mq samples, before and after cycling. FIG. 17 includes SEM micrographs at 50 k× of cathodes spray coated with 17Hq, 17Lq, and 17Mq samples, before and after cycling. FIG. 18 includes SEM micrographs at 5 k× of cathodes spray coated with 10Hq, 10Lq, and 10Mq samples, before and after cycling.

Referring to FIGS. 16-18, the morphology of as made and post cycling cathodes, seen in FIGS. 16 and 17, was uniform across all x=0.25 and x=0.17 samples. While x=0.10 samples' morphology, seen in FIG. 18, was not consistent. 10Hq was consistent with the higher nickel content samples, while 10Lq and 10Mq were consistent with each other. All samples had consistent morphology before and after cycling; there was no evidence of changing surface structure or particle morphology as a result of electrochemical cycling.

Both nickel content and quench method influence the structure, and electrochemical behavior of LRMO cathodes. In general, the materials had higher capacities and more classical voltage behavior when synthesized with a higher Ni content and/or a more rapid quench rate, though the outcomes were sometimes nuanced.

The XRD patterns of LRMO powders showed structural dependence on both nickel content and quench method. Slight crystallographic variation across samples of various nickel contents was expected and was observed between the x=0.25 and x=0.17 and 10Hq samples. The XRD patterns of 10Lq and 10Mq have a large number of secondary peaks while 10Hq's XRD pattern does not. The secondary peaks seen in the patterns of 10Lq and 10Mq are consistent with the secondary peaks seen in the 25Mq and 17Mq samples' XRD patterns. These examples suggest that quench rate is important in determining structure, phase content, and phase purity.

The secondary layered phase found in many samples may be the result of localized relatively nickel-rich heterogeneities with the corresponding larger lattice parameters. The (110) peak splitting is present in all samples' XRD patterns except 25Hq and 25Lq's, which demonstrates that slower quenching gives rise to nickel heterogeneity. The 25Mq and 17Mq samples' XRD patterns have additional secondary peaks at (101), (104), (107) which are seen in the 10Lq and 10Mq samples. Though it must be noted that the (104) secondary peaks for 25Mq and 10Lq likely arise from contaminates. These additional peaks, while varied, appear for all metal quenched samples, which demonstrates how structure depends on both nickel content and quenching. These data support the concept that slower quench methods giving rise to segregated nickel-rich phase regions, as well as the formation of contaminates in the material, thus determining the localized ordering of nickel in the samples regardless of Ni content. FIG. 24 shows a schematic of the proposed structure for the secondary layered phase.

Since $Ni^{2+}$ ions have a greater ionic radius than Mn ions, it is believed that with less Ni present, there are fewer instances of local lattice expansion. Samples with higher nickel content should have higher degrees of long-range ordering distributing the nickel ions, with more favorable orderings resulting in smaller lattice parameters. Rapidly quenching these sample preserves long-range ordering and smaller lattice parameters, while slower quenching would allow for the nucleation of contaminates and the evolution of nickel heterogeneities, both of which would distort the average lattice parameter. The cross over point seen in FIG. 26B for lattice parameter "a" is at x=0.11, which further suggests that there is a synthetic limit 0.17>x>0.10.

The samples' electrochemical behavior was affected by both the nickel content as well as the quench method. The first charge behavior of the material is indicative of purity and capacity, as higher performance materials are known to exhibit a single strong plateau consistent with a phase transition via nickel-catalyzed oxygen and lithium loss.

Figure 19A:
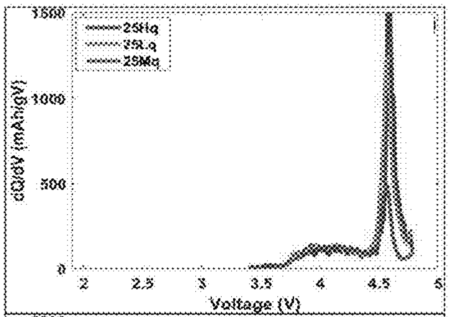
FIGS. 19A-19C are graphs showing smoothed spline fits of dQ/dV vs. V data for the first charging cycle of x=0.25, x=0.17, and x=0.10 samples.
Figure 19B:
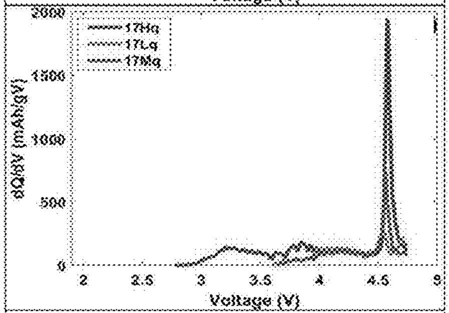
Figure 19C:
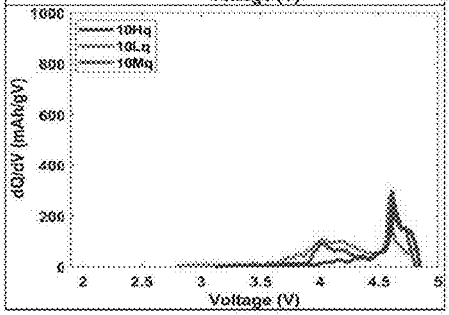

FIGS. 19A-19C are graphs showing smoothed spline fits of dQ/dV vs. V data for the first charging cycle of x=0.25, x=0.17, and x=0.10 samples.

Referring to FIGS. 19A-19C, the 4.5 V peaks seen on the dQ/dV plots demonstrate that all samples have an initial 4.5 V plateau to some degree. However, FIGS. 12A-14C show that only some of the samples have inflection points at 4.5 V on subsequent charges. This demonstrates that all samples undergo similar phase transformations initially, though the persistence of the inflection points in some samples suggests that the reaction is not always able to be completed during the initial charge. The samples with the secondary peaks in their patterns are the same as those with the inflection points on latter cycles, and so may be related. This is further supported by how higher nickel content would drive the secondary layered phase peaks to be to the left of the primary peaks. While some samples such as 25Mq and 10Lq display signs of rock salt contamination this contamination does not preclude the possibility of some other phase transition. Regardless, these transformations occur over a greater number of cycles and gradually fade, suggesting that ultimately the sample is still fully, and irreversibly transformed.

The presence of inflection points on non-water quenched samples, besides some on 10Hq, provides further evidence that these inflection points are related to phase heterogeneity. The 10Hq sample starts with these inflection points, but by the 54th cycle its charge profile more closely resembles the x=0.17 samples than the x=0.10 samples it originally resembled. These data are thus consistent with the evolution of nickel heterogeneities prolonging the 4.5 V phase transition.

Figure 20A:
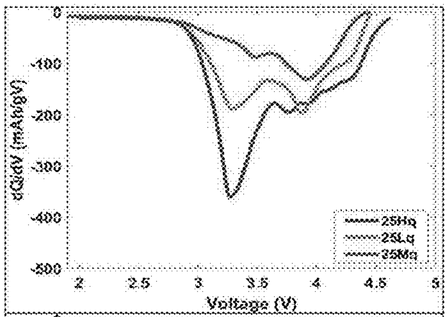
FIGS. 20A-20C are graphs showing smoothed spline fits of dQ/dV vs. V data for the second charging cycle of x=0.25, x=0.17, and x=0.10 samples.
Figure 20B:
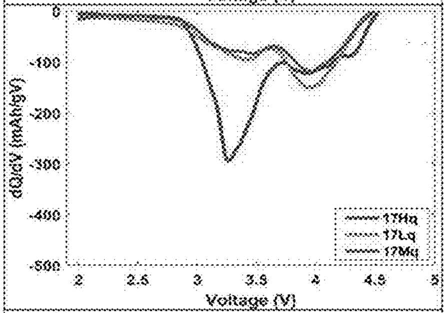
Figure 20C:
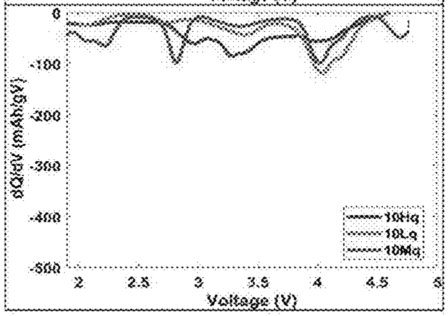
Figure 21A:
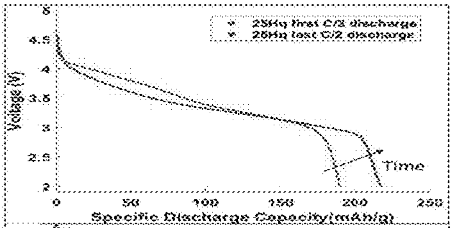
FIGS. 21A-21C are graphs showing a first C/2 discharge and a last C/2 discharge of 25Hq, 25Lq, and 25Mq samples.
Figure 21B:
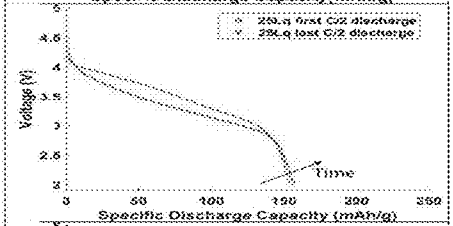
Figure 21C:
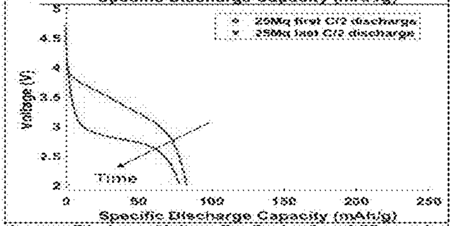
Figure 21D:
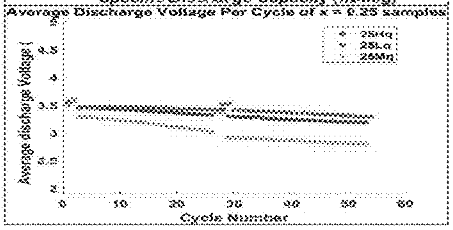
FIG. 21D is a graph showing the average discharge voltage per cycle over the course of cycling, for the 25Hq, 25Lq, and 25Mq samples.
Figure 22A:
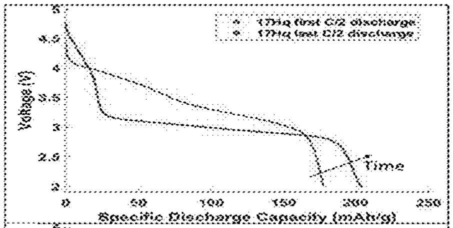
FIGS. 22A-22C are graphs showing a first C/2 discharge and a last C/2 discharge of 17Hq, 17Lq, and 17Mq samples.
Figure 22B:
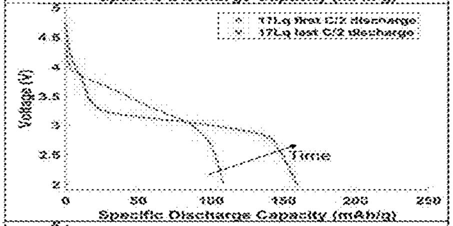
Figure 22C:
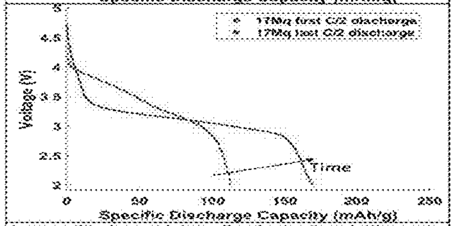
Figure 22D:
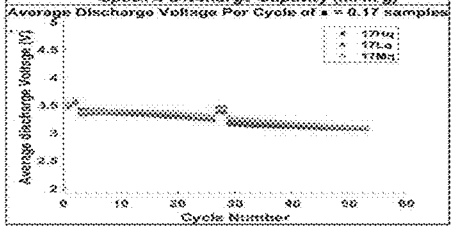
FIG. 22D is a graph showing the average discharge voltage per cycle over the course of cycling, for the 17Hq, 17Lq, and 17Mq samples.
Figure 25A:
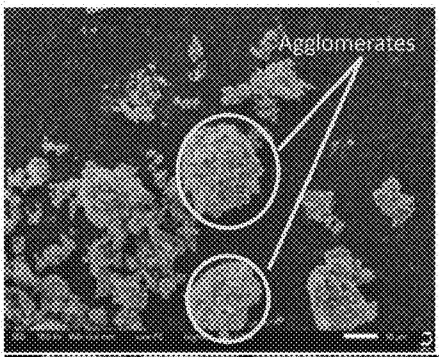
FIGS. 25A-25B are SEM micrographs of agglomerates and FIGS. 25C-25D are higher magnification SEM micrographs of crystallites (e.g., crystalline grains) in the agglomerates.
Figure 25B:
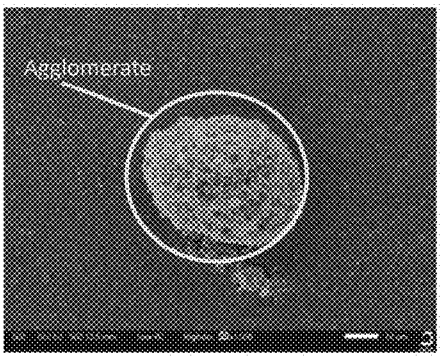
Figure 25C:
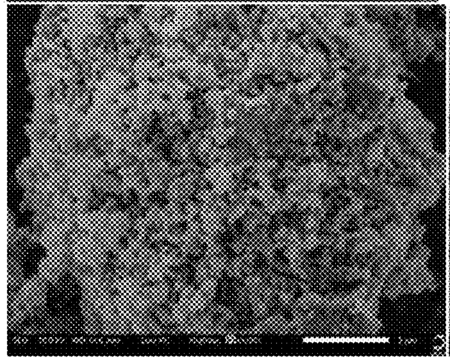
Figure 25D:
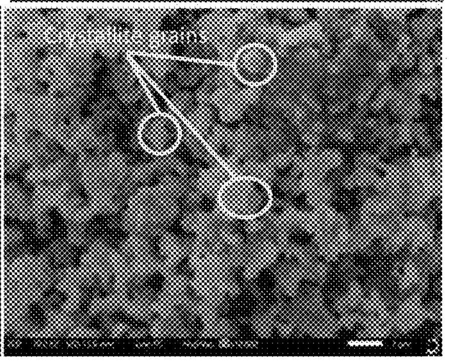

FIGS. 20A-20C are graphs showing smoothed spline fits of dQ/dV vs. V data for the second charging cycle of x=0.25, x=0.17, and x=0.10 samples. FIGS. 21A-21C are graphs showing a first C/2 discharge and a last C/2 discharge of 25Hq, 25Lq, and 25Mq samples, and FIG. 21D is a graph showing the average discharge voltage per cycle over the course of cycling, for the 25Hq, 25Lq, and 25Mq samples. FIGS. 22A-22C are graphs showing a first C/2 discharge and a last C/2 discharge of 17Hq, 17Lq, and 17Mq samples, and FIG. 22D is a graph showing the average discharge voltage per cycle over the course of cycling, for the 17Hq, 17Lq, and 17Mq samples. FIGS. 23A-23C are graphs showing a first C/2 discharge and a last C/2 discharge of 10Hq, 10Lq, and 10Mq samples, and FIG. 23D is a graph showing the average discharge voltage per cycle over the course of cycling, for the 10Hq, 10Lq, and 10Mq samples.

Discharge profiles of the samples also show cycling behavior over time is influenced by nickel composition and quench method. Referring to FIGS. 20A-20C, the peaks of the water quenched samples are initially on average lower in voltage than the liquid nitrogen and metal quenched samples, suggesting that the nickel heterogeneity influences voltage. The average discharge voltages of the water quenched samples also tended to be lower than the other samples of the same composition, except for 25Mq. The dQ/dV patterns of 17Lq and 17Mq, and FIGS. 21A-23D, show how the discharge profiles evolved different behaviors over cycling. The voltages of the x=0.17 samples, while the most homogenous in voltage behavior, also saw greater degrees of voltage decay. The exceptions to this are the 25Mq sample, which saw voltage decay, over the course of cycling; and the x=0.10 samples, which saw voltage increase for their C/20 discharge and voltage fade for their C/2 discharges. It is also important to note that the displayed average voltage fade experienced by most samples was due to the evolution of greater capacities at those voltages as opposed to degradation of the samples. The stark difference in discharge behaviors seen in the samples suggests that differences in quench rate are also manifesting in different electrochemical reactions.

Voltage decay in 25Hq and 25Lq is minor when compared to x=0.17 samples' voltage decay, their associated voltage plateaus are also at different voltages. The more minor 25Hq and 25Lq voltage decay is mostly consistent with a phase transformation to a spinel-like phase over the course of cycling, which is associated with a 3 V plateau. The more severe voltage decay of the x=0.17 samples is also mostly consistent with a phase transformation to a spinel-like phase. In both cases, but particularly the case of x=0.17 samples, the voltage plateaus are close to the average voltage of the $Ni^{2+/3+/4+}$ redox in manganese rich environments, suggesting that these plateaus are driven by nickel redox, and thus nickel distribution. This loss of voltage and nickel redistribution is mostly consistent with the evolution of the spinel-like phase, with the main inconsistency is the increase in capacity, while evolution of spinel-like phases has been associated with both initial capacity gains and losses it seems to universally be associated with significant structural degradation. Therefore, the voltage decay of the structurally robust 25Hq, 25Lq and x=0.17 samples is likely not entirely due to the evolution of a spinel-like phase.

The evolution of a spinel-like phase also does not account for the differences in behavior between discharge rates, particularly with x=0.10 samples. The C/20 discharges of the x=0.10 samples start at a voltage resembling a decayed sample and over the course of cycling their voltage increase; the C/2 discharges of x=0.10 samples experienced some degree of voltage fade. While the lower initial potential of the samples is likely do to their greater manganese concentration and subsequent lower potential of the nickel redox, the inconsistent voltage behavior cannot be entirely accounted for by the formation of spinel-like phase, especially when considering their rapid increases in capacity. By contrast 25Mq's lower manganese concentration, capacity loss, and more rapid voltage decay indicate formation of spinel-like phase. These factors, practically how its discharge voltage plateau starts at 3 V, are consistent with the voltage-decay mechanism of spinel-like phase evolution. It is possible that the phase impurities evolved during a slow quench could have left 25Mq more susceptible to the evolution of the spinel-like phase. The voltage plateaus of 25Mq fall within the range of the $Mn^{3+/4+}$ redox couple, and it would be possible for the manganese and nickel to form hybrid redox couples which could also account for the voltage decay. 10Lq and 10Mq's discharge plateaus, similarly to 25Mq start at 3 V, which suggests these samples might also be experiencing some degree of transformation to a spinel-like phase. The XRD of all samples, besides 10Mq, have peaks that are indicative of the R-3m layered structure, further suggesting that the evolution of a spinel-like phase is not entirely responsible for the voltage fade or the changes in capacity.

FIG. 24 is a schematic showing how phase impurity inclusion in the 25Mq sample with R-3m structure and lattice parameter a'>a cause the secondary peak as seen to the left of 25Mqs (104) peak. As shown in FIG. 24, the redox of nickel driving the evolution of these plateaus would suggest that the nickel content is homogenizing over time.

The electrochemical cycling data of the LRMO cathodes saw consistent increases in capacity, except for 25Mq. While x=0.25 samples saw minor gains in capacity the x=0.17 samples saw more significant increases, and the x=0.10 samples saw even more. The increase in percentage of specific capacity over cycling therefore exhibited an inverse relationship to nickel content regardless of quench method. The greatest increases in capacity were seen in the 10Hq sample and then the 10Mq and 10Lq samples. Since impurities are linked to nickel heterogeneity, this relationship suggests that the capacity increases are at least partially driven by the nickel content homogenizing over the course of cycling via an "electrochemical annealing" process.

The comparative XRD of the post cycling cathode material to pristine cathode materials shows very similar behaviors across all samples besides 10Lq and 10Mq, with transition metal superlattice peaks disappearing after cycling. 10Lq has some preserved superlattice peaks post cycling, and the 10Mq sample sees the emergence of several new peaks, marking a significant difference between the two samples. This difference further shows the importance of quench rate, as there appears to be a synthetic lower limit for LRMO, where 0.17>x>0.10, under slower quenching conditions. However, the 10Hq sample's behavior is different and shows that more rapid quenching of the sample can result in stability and long-term performance associated with higher Ni content samples.

Electrochemical testing of these materials show that the fast quench material has excellent capacity and capacity retention and is the only variant to exhibit an increase in capacity during cycling. After 50 full charge/discharge cycles, this material yields specific capacity of nearly 230 mAh/g at a C/2 rate, which is far better than materials that were cooled in other ways.

The finding that extremely rapid cooling of this class of materials during synthesis using immersion in water results in material with superior and differentiated crystal structure as well as never reported electrochemical behavior. Specifically, we find that this water quenched material: (a) showed a significant increase in capacity over 50 cycles, (b) did not exhibit the commonly reported voltage fade (wherein the average discharge voltage of the cell decreases significantly over use), (c) has a specific capacity that exceeds 250 mAh/g after 25 cycles at a C/2 rate and 4 cycles at a C/2 rate, and (d) has a specific capacity exceeds 230 mAh/g (e.g., 231 to 240 mAg/g) after 50 cycles at the C/2 rate with less than 10% loss in average voltage during discharge (e.g., as shown in FIG. 21D for example).

Figure 26A:
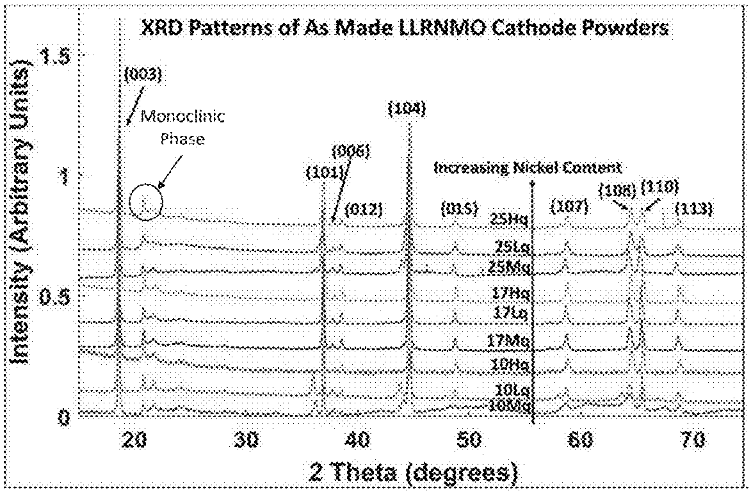
FIG. 26A is a graph of intensity (in arbitrary units) versus angle 2 Theta in degrees showing the indexed normalized and offset XRD patterns of pristine layered lithium rich nickel manganese oxide (LLRNMO) powders.
Figure 26B:
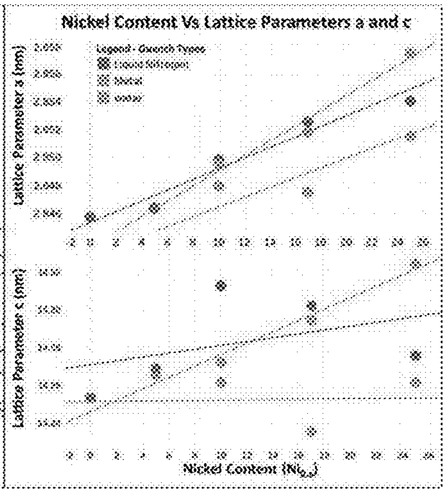
FIG. 26B includes a top graph showing the trend between lattice parameter "a" and the nickel content of samples, and a bottom graph showing the trend between lattice parameter "c" and the nickel content of samples, obtained via single phase Rietveld fitting.

FIG. 26A is a graph showing the indexed normalized and offset XRD patterns of pristine LRMO active material powders having the formula: $Li[Ni_xLi_{(1/3-2x/3)}Mn_{(2/3-x/3)}]O_2$ where the nickel content, x=0.25. This formula may also be written as $Li_z(Mn_yNi_{1-y})_{2-z}O_2$, where z=1.16, and y=0.7, and that were formed using Hq, Lq, and Mq (i.e., water, liquid nitrogen and metal quenching, respectively). FIG. 26B includes a top graph showing the trend between lattice parameter "a" and the nickel content of samples, and a bottom graph showing the trend between lattice parameter "c" and the nickel content of samples, obtained via single phase Rietveld fitting.

As shown in FIG. 26A, the X-ray diffraction assessment of the materials shows that the materials possessed an $LiNiO_2$-related hexagonal (e.g., rhombohedral) phase having space group (R-3m), and a $Li_2NiO_3$-related monoclinic phase having space group (C2/c). This suggests that all of the samples had an expected layered structure. Of note is that in samples produced by the Hq method, the monoclinic phase diffraction peaks are most well-defined, suggesting that this method generates a more well-defined crystal structure.

There were also superlattice peaks around 220 which are indicative of this family of compounds. The XRD patterns of the 10Lq and 10Mq samples also had significant peaks to the left of their (101), (104), (015), (107), and (108) peaks, suggesting the presence of phase impurities with similar structure and a larger lattice parameter than the bulk phase. The lack of other peaks suggest that, in this case, all impurities are isostructural with the bulk phase of the material. The XRD pattern of the 10Hq sample showed only small additional (107), (108), and (110) peaks. While not as visible the XRD patterns, the 17Mq and 25Mq samples also had indications of phase impurities; there are small secondary peaks to the left of the (104) and their (107) peaks, respectively. In addition, the (108) peak of the 25Mq sample had a shoulder to its left. Closer examination of the (104) maxima indicated the difference between this secondary set of peaks, with the secondary peaks of 25Hq and 10Mq samples, suggest that the isostructural impurities are likely a nickel rich layered structure, while the peaks for the 10Lq and 25Mq samples suggest the isostructural impurities are likely ordered rock salt. These data indicate that there should be two sources for these peak sets: one being the additional layered phase and the other being contaminate rock salt. Herein, "secondary layered phase" will refer to local regions with compositional variance and corresponding structural distortions, specifically areas with higher nickel content and the resultant larger lattice parameter, while "contaminates" will refer to the rock salt phases.

The lattice parameters of the powders in FIG. 26A were obtained using a single phase-based Rietveld refinement, all samples had weighted R values less than 6, and lattice parameters of known compositions fell within the bounds seen in literature (see S1 available online at stacks.iop.org/JES/167/160518/mmedia, and incorporated herein by reference in its entirety). Refinement was confined to a single phase. FIG. 26B shows that lattice parameter "a" decreased with nickel content in the samples regardless of quenching technique. This same trend was broadly suggested for lattice parameter "c", though the liquid nitrogen quenched x=0.10, 0.17, and 0.25 samples deviated from this trend. The quench methods at x>0.10 showed that the slower quenching methods may result in a larger lattice parameter "a", with the same general trend for lattice parameter "c", with the exceptions of 10Lq and 17Lq samples.

In one embodiment, a method of forming an active material for a positive electrode of a lithium-ion battery comprises quenching a powder of the active material in water. In one embodiment, the method further comprises firing the active material powder prior to the quenching. The active material may be fired at a temperature of at least 800° C. The water may be at room temperature prior to the quenching, and the powder of the active material may be quenched at a rate of least 1750° C./second.

In one embodiment, the active material comprises layered lithium-rich nickel manganese oxide. The excess Li, Ni and Mn atoms may be homogeneously and uniformly distributed throughout transition metal crystal lattice sites, such that there are no crystalline volumes greater than 3×3×3 nm in the material in which there is a greater than 3% difference between ratios of Ni, Mn and Li atoms compared to average ratios of the Ni, Mn and Li atoms of a bulk material. Particles of the powder of the active material may be in a shape of agglomerates which have an average size ranging from about 0.1 μm to about 20 μm, and the agglomerates of the powder of the active material are composed of crystallites having an average size ranging from about 25 nm to about 500 nm. The powder of the active material may comprise a composite of hexagonal and monoclinic phases after the quenching, and is a combination of $LiMO_2$ R-3m and $Li_2MnO_3$ C2/m phases, where M is at least one of Ni or Mn. The powder of the active material may comprise a solid solution with a crystal structure that predominately or completely possess a C2/m symmetry. The powder of the active material may comprise a solid solution with a crystal structure that predominately or completely possess a R-3m symmetry.

In one embodiment, the active material is represented by a formula: $Li[Ni_xLi_{(1/3-2x/3)}Mn_{(2/3-x/3)}]O_2$ where $0<x<0.5$. In one embodiment, the active material is substantially free of cobalt; and the active material is represented by the formula: $Li[Ni_xLi_{(1/3-2x/3)}Mn_{(2/3-x/3)}]O_2$ where $0.19<x<0.26$, or by the formula: $Li[M_xLi_{(1/3-2x/3)}Mn_{(2/3-x/3)}]O_2$ where $0.19<x<0.26$, and where M comprises Ni and at least one of Ti, Fe, Al or Cr.

In one embodiment, the water comprises an additive solvated therein. The water may comprise from 0.01 moles per liter to 1.0 moles per liter of the additive. In one embodiment, additive comprises an acid, which may be selected from sulfuric acid, citric acid, acetic acid, phosphoric acid, hydrochloric acid, ammonium phosphate, or combinations thereof. In another embodiment, the additive comprises a carbohydrate, which may be selected from fructose, galactose glucose, lactose, maltose, sucrose, or a combination thereof.

In one embodiment, the active material is placed into the positive electrode of the lithium-ion battery cell which further comprises a negative electrode and an electrolyte. The active material comprises hexagonal and monoclinic phases prior to the electrochemical cycling of the battery; and the active material powder does not comprise the monoclinic phase after the electrochemical cycling.

In one embodiment, a specific discharge capacity of the battery cell increases by at least 10% over 50 electrochemical cycles at charge rate of C/20 and discharge rate of C/2 in a voltage range of 2V to 4.8V at room temperature; and the battery cell has a specific capacity of at least 230 mAh/g after the 50 electrochemical cycles at the discharge rate of C/2.

In one embodiment, a lithium-ion battery cell comprises: a negative electrode; an electrolyte; and a positive electrode comprising a layered lithium rich nickel manganese oxide active material, wherein a specific discharge capacity of the battery cell increases by at least 10% over 50 electrochemical cycles at a charge rate of C/20 and a discharge rate of C/2, and the battery cell has a specific capacity of at least 230 mAh/g after the 50 electrochemical cycles at the discharge rate of C/2.

In one embodiment, the specific discharge capacity of the battery cell increases by at least 10% over two electrochemical cycles at the charge rate of C/20 and the discharge rate of C/20, followed by twenty five electrochemical cycles at the charge rate of C/20 and the discharge rate of C/2, followed by two additional electrochemical cycles at the charge rate of C/20 and the discharge rate of C/20, and followed by twenty five additional electrochemical cycles at the charge rate of C/20 and the discharge rate of C/2 in a voltage range of 2V to 4.8V at room temperature. In one embodiment, an average discharge voltage of the battery cell does not decrease more than 10% over the 50 electrochemical cycles at the discharge rate of C/2.

In one embodiment, the active material is represented by a formula: $Li[M_xLi_{(1/3-2x/3)}Mn_{(2/3-x/3)}]O_2$ where $0<x<0.5$, and M comprises Ni or a combination of Ni and at least one of Ni, Al, Fe or Cr. In one embodiment, the active material is substantially free of cobalt; and the active material is represented by the formula: $Li[M_xLi_{(1/3-2x/3)}Mn_{(2/3-x/3)}]O_2$ where $0.19<x<0.26$ and M comprises Ni. In one embodiment, the active material is represented by a formula $y(LiMO_2)$-$(1-y)LiMnO_3$, where y ranges between 0.8 and 1, and M comprises at least Ni and Mn.

In one embodiment, particles of the powder of the active material are in a shape of agglomerates which have an average size ranging from about 0.1 μm to about 10 μm, and the agglomerates of the powder of the active material are composed of crystallites having an average crystal size ranging from about 25 nm to about 500 nm; and particles of the active material powder have at least one of a spinel surface layer, a carbon coating or passivated oxygen bonds on a surface.

In one embodiment, excess Li, Ni and Mn atoms are homogeneously and uniformly distributed throughout transition metal crystal lattice sites, such that there are no crystalline volumes greater than 3×3×3 nm in the material in which there is a greater than 3% difference between ratios of Ni, Mn and Li atoms compared to average ratios of the Ni, Mn and Li atoms of a bulk material.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method, comprising:

sintering a lithium-rich metal oxide (LRMO) material at a sintering temperature to form a sintered LRMO material; and quenching the sintered LRMO material from the sintering temperature to room temperature in less than 500 milliseconds to form a quenched LRMO material represented by a chemical formula:

$$Li_x(Mn_yNi_{1-y})_{2-x}O_2,$$

wherein x is greater than 1.05 and less than 1.25, and y ranges from 0.95 to 0.1.

2. The method of claim 1, wherein:

the sintering temperature is at least 800° C.; and the quenching the sintered LRMO material from the sintering temperature to the room temperature comprises quenching the sintered LRMO material from the sintering temperature to the room temperature in 200 milliseconds or less.

3. The method of claim 1, wherein:

the sintering temperature is 900° C. to 950° C.; and the quenching the sintered LRMO material from the sintering temperature to the room temperature comprises quenching the sintered LRMO material from the sintering temperature to the room temperature in 100 to 200 milliseconds.

4. The method of claim 1, wherein:

the sintering comprises sintering the LRMO material in a furnace; and the quenching the sintered LRMO material comprises quenching the LRMO material in a quench bath.

5. The method of claim 4, wherein:

a time between removing the sintered LRMO material from the furnace and quenching the sintered LRMO material in the quench bath to the room temperature of 25 degrees Celsius is 200 milliseconds or less; and the quench bath comprises a water containing bath.

6. The method of claim 4, wherein the quench bath comprises an oil bath, an alcohol bath or a water bath containing an additive comprising an acid, a carbohydrate, an alcohol, or a combination thereof.

7. The method of claim 1, further comprising:

forming a mixture of water and metalloorganic precursors of lithium, nickel and manganese;

heating the mixture to form a gel; and thermally decomposing the gel using microwave radiation to form the LRMO material.

8. The method of claim 7, wherein:

the gel comprises a from 0.01 to 0.20 molar fractional excess of the metalloorganic precursor of the lithium with respect to the metalloorganic precursors of nickel and manganese; and the LRMO material comprises an inorganic LRMO material comprising lithium, nickel, manganese and oxygen.

9. The method of claim 1, further comprising drying the quenched LRMO material to form a LRMO active material, and providing the LRMO active material into a cathode electrode of a lithium-ion battery containing an anode electrode and an electrolyte.

10. The method of claim 9, wherein the LRMO active material exhibits at least one of:

crystalline particles of the LRMO active material exhibit a uniform distribution of Mn and Ni atoms throughout the crystalline particles such that there are no regions that are Ni rich or Mn rich when imaged by HAADF EDS;

an increase in a ratio of (006)+(102):(101) x-ray diffraction peaks of at least 6% compared to a non-quenched LRMO material having the same composition;

a (003) to (104) x-ray diffraction peak ratio of greater than 2;

delivery of at least 165 mAh/g specific capacity on first discharge of the lithium-ion battery;

less than 10% loss in average discharge voltage at a C/20 rate after 200 charge/discharge cycles of the lithium-ion battery; or less than 10% capacity fade over 200 C/5 charge/discharge cycles of the lithium-ion battery.

11. A method, comprising:

thermally decomposing a precursor material using microwave radiation to form a thermally decomposed lithium-rich metal oxide (LRMO) material;

sintering the thermally decomposed LRMO material to form a sintered LRMO material; and quenching the sintered LRMO material to form a quenched LRMO material represented by a chemical formula:

$$Li_x(Mn_yNi_{1-y})_{2-x}O_2,$$

wherein x is greater than 1.05 and less than 1.25, and y ranges from 0.95 to 0.1.

12. The method of claim 11, wherein the precursor materials comprise metalloorganic precursors of Li, Mn, and Ni selected from at least one of acetates, carbonates, nitrates, sulfates, or hydroxides of Li, Mn, and Ni.

13. The method of claim 12, further comprising:

forming a mixture of water and the metalloorganic precursors of lithium, nickel and manganese; and heating the mixture to form a gel, wherein the step of thermally decomposing the precursor materials comprises heating the gel using the microwave radiation, and wherein the gel comprises from 0.01 to 0.20 molar fractional excess of the metalloorganic precursor of lithium with respect to the metalloorganic precursors of Mn and Ni.

14. The method of claim 11, wherein the precursor materials comprise precursors that are co-precipitated hydroxides of Mn and Ni mixed with lithium carbonate.

15. The method of claim 11, wherein the quenching comprises quenching the sintered LRMO material from a sintering temperature to room temperature in less than 500 milliseconds to form a quenched LRMO material.

16. The method of claim 11, further comprising drying the quenched LRMO material to form a LRMO active material, and providing the LRMO active material into a cathode electrode of a lithium-ion battery containing an anode electrode and an electrolyte.

* * * * *